Feb. 2, 1960  E. E. FRANKS, JR  2,923,343
LENGTH MEASURING AND CUTTING MEANS FOR SPRING COILING
MACHINE PROVIDED WITH TWO SELECTIVELY USEABLE
DRIVE MECHANISMS FOR THE FEED ROLLS
Filed Jan. 28, 1957  8 Sheets-Sheet 1
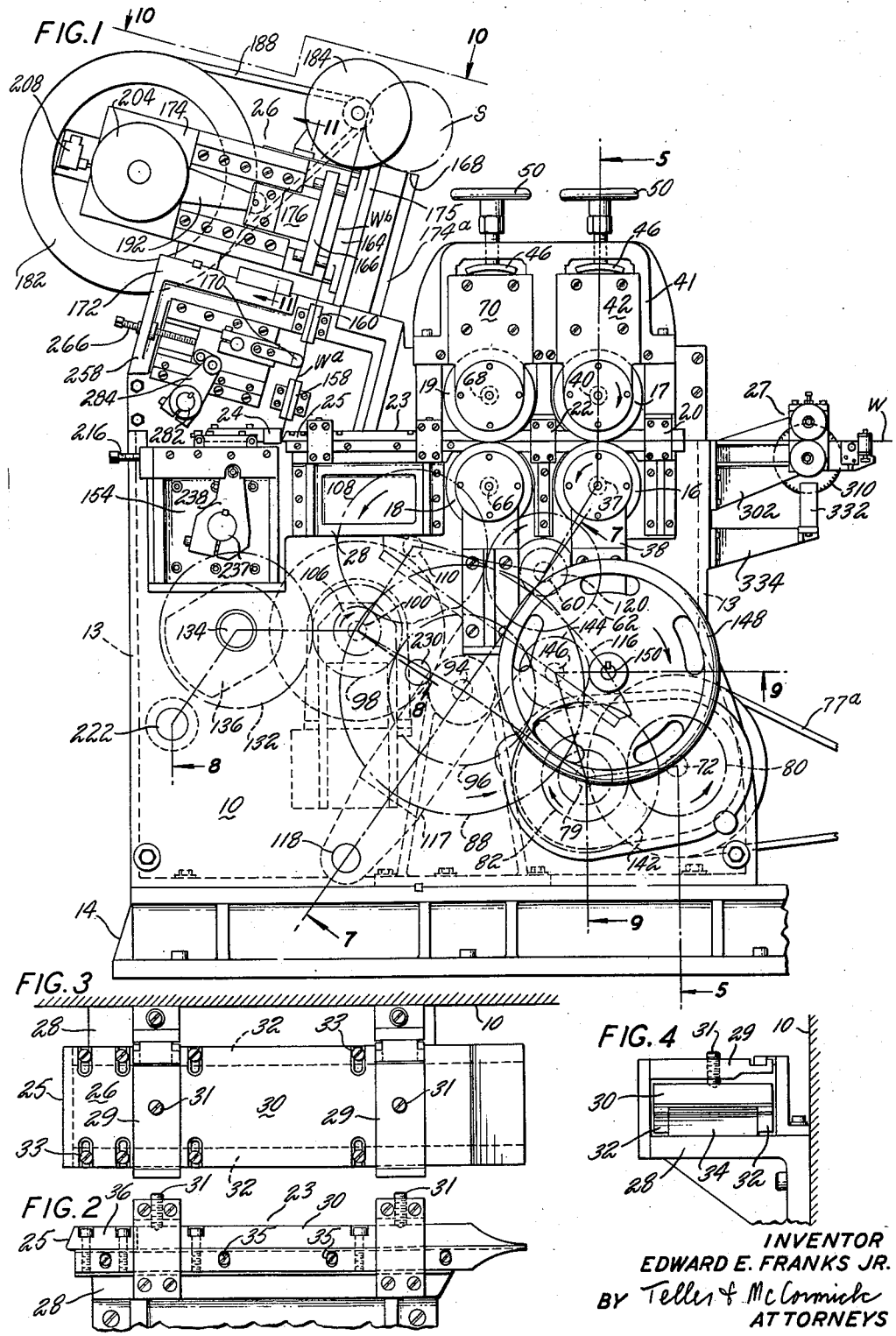
INVENTOR
EDWARD E. FRANKS JR.
BY Teller & McCormick
ATTORNEYS

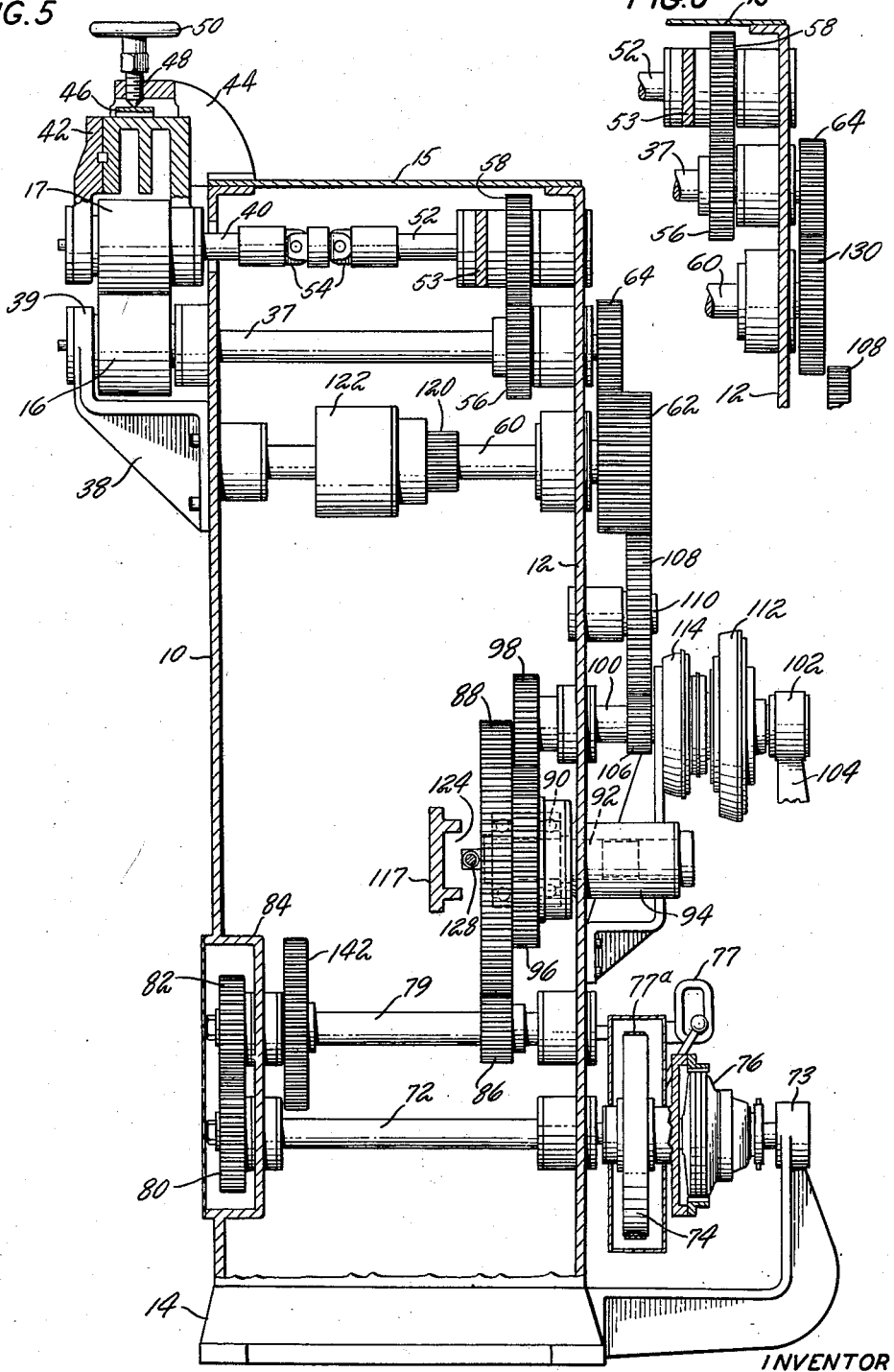

Feb. 2, 1960     E. E. FRANKS, JR     2,923,343
LENGTH MEASURING AND CUTTING MEANS FOR SPRING COILING
MACHINE PROVIDED WITH TWO SELECTIVELY USEABLE
DRIVE MECHANISMS FOR THE FEED ROLLS
Filed Jan. 28, 1957     8 Sheets-Sheet 3

INVENTOR
EDWARD E. FRANKS JR.
BY Teller & McCormick
ATTORNEYS

Feb. 2, 1960 E. E. FRANKS, JR 2,923,343
LENGTH MEASURING AND CUTTING MEANS FOR SPRING COILING
MACHINE PROVIDED WITH TWO SELECTIVELY USEABLE
DRIVE MECHANISMS FOR THE FEED ROLLS
Filed Jan. 28, 1957 8 Sheets-Sheet 4
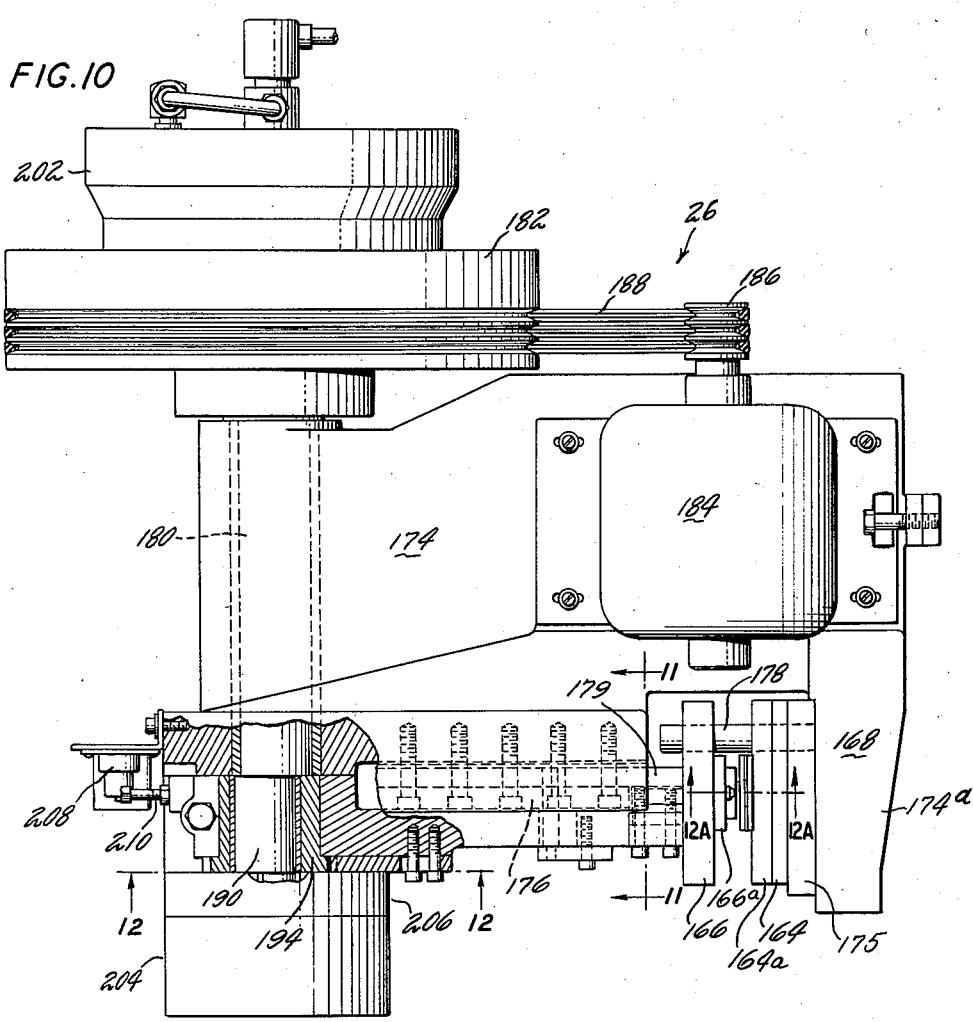
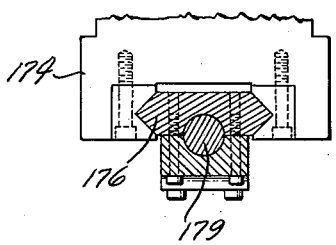
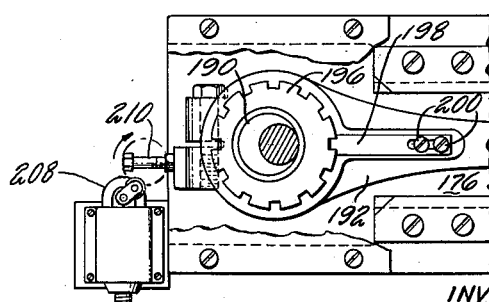
INVENTOR
EDWARD E. FRANKS JR.
BY Teller & McCormick
ATTORNEYS

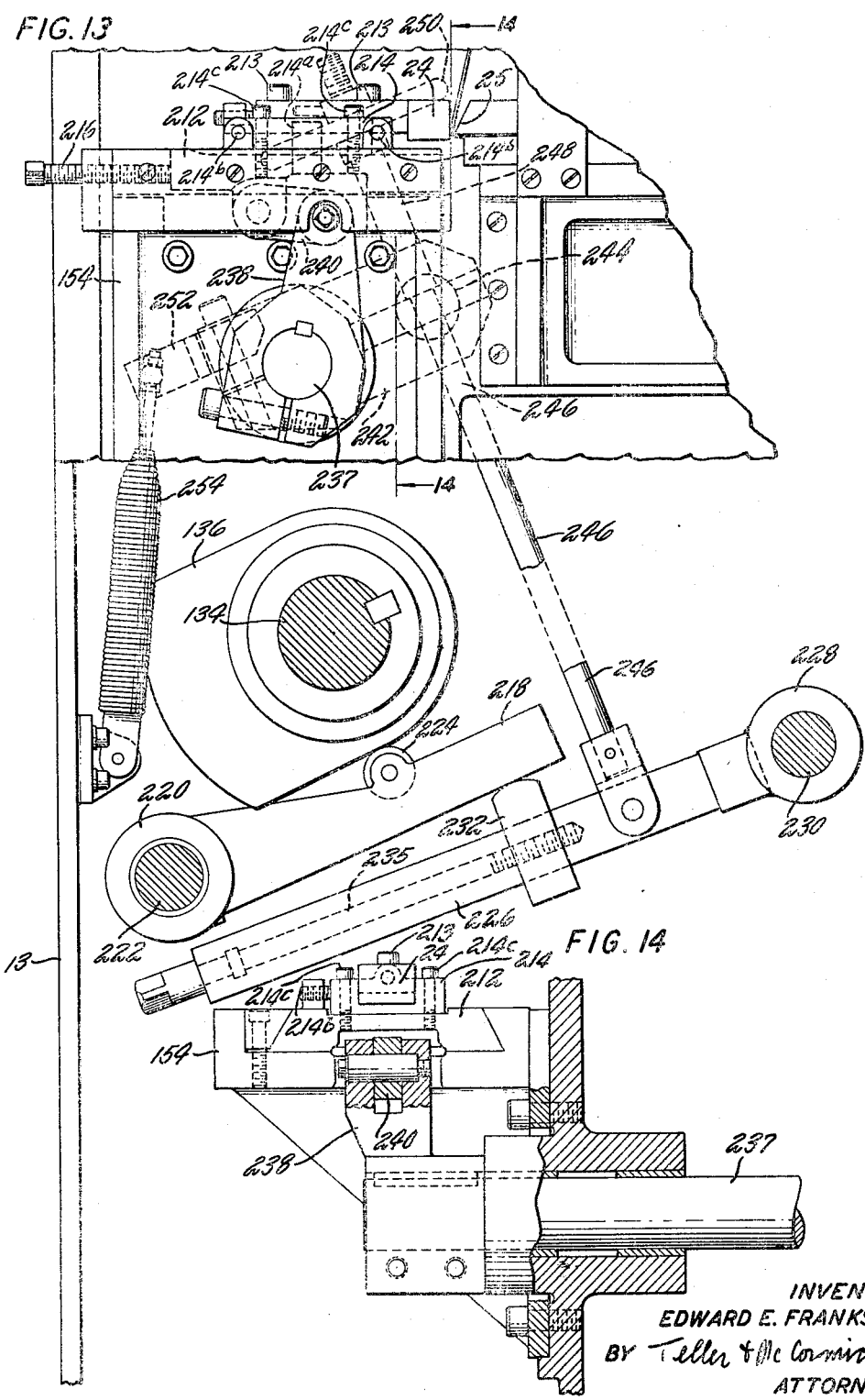

Feb. 2, 1960 E. E. FRANKS, JR 2,923,343
LENGTH MEASURING AND CUTTING MEANS FOR SPRING COILING
MACHINE PROVIDED WITH TWO SELECTIVELY USEABLE
DRIVE MECHANISMS FOR THE FEED ROLLS
Filed Jan. 28, 1957 8 Sheets-Sheet 6
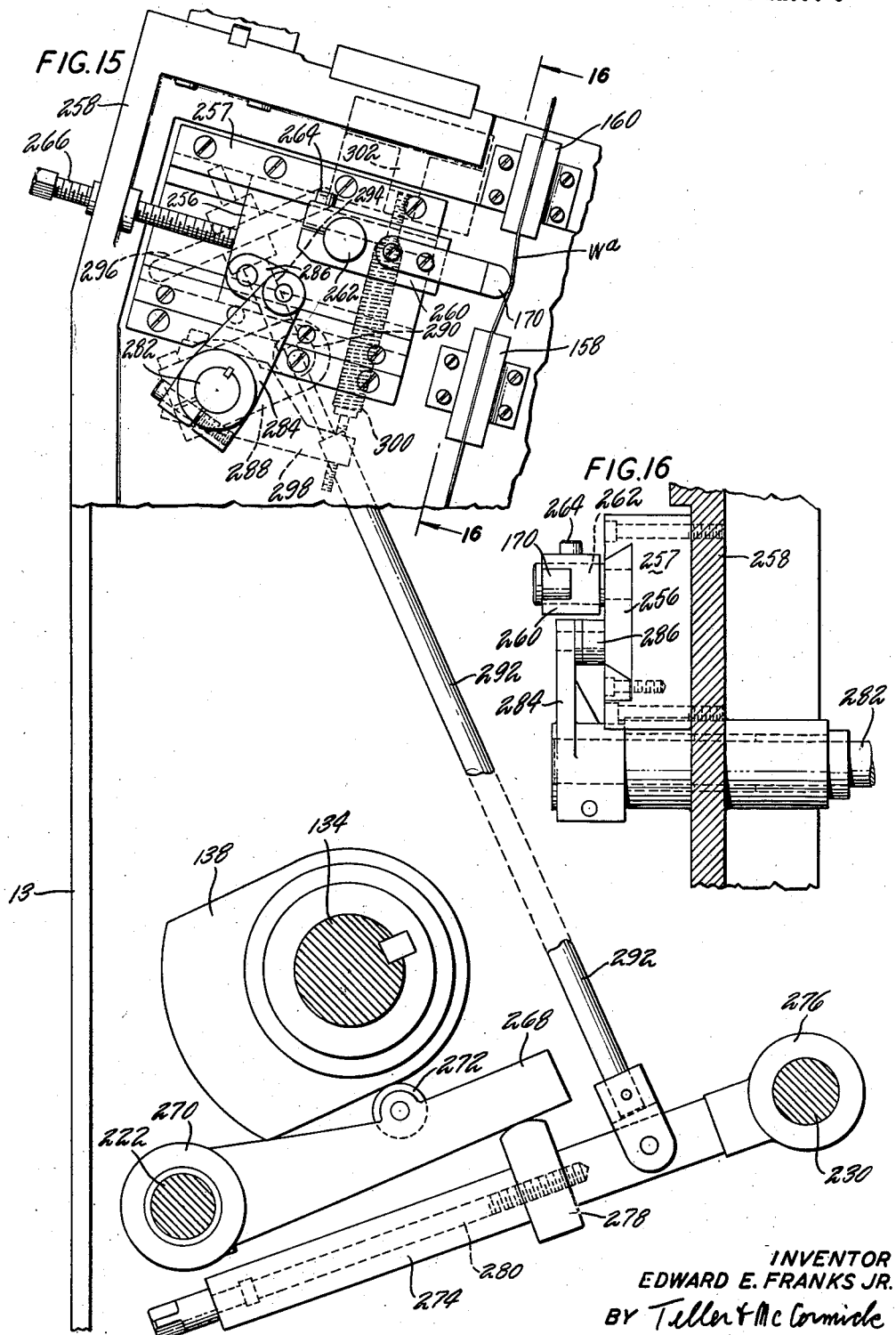
INVENTOR
EDWARD E. FRANKS JR.
BY Tiller & McCormick
ATTORNEYS

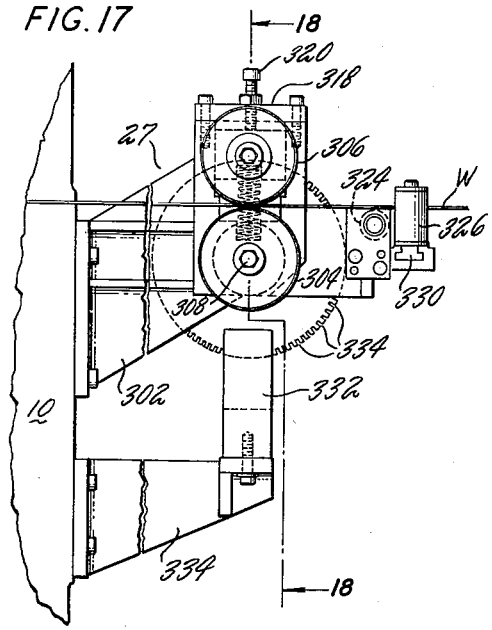
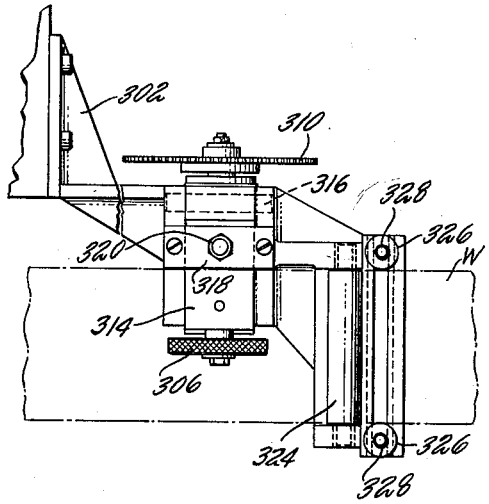
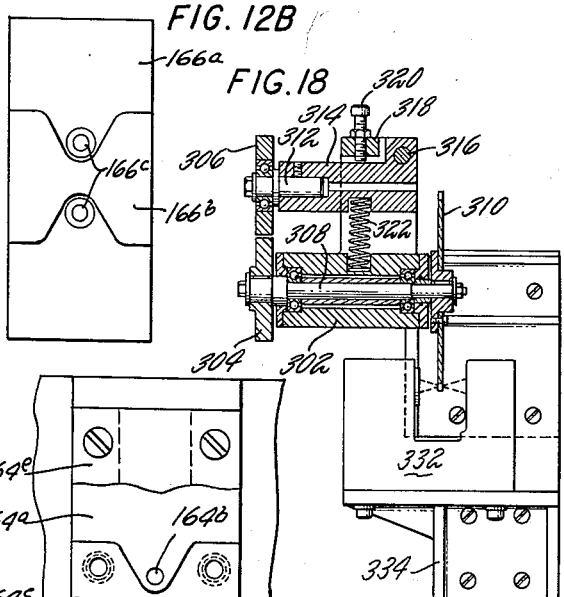
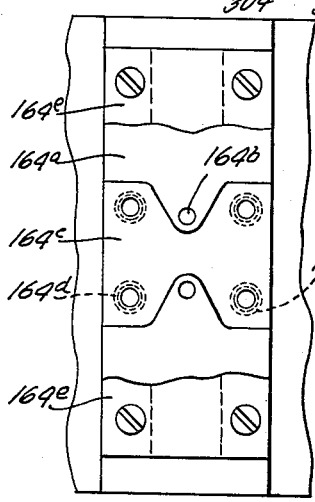

Feb. 2, 1960   E. E. FRANKS, JR   2,923,343
LENGTH MEASURING AND CUTTING MEANS FOR SPRING COILING
MACHINE PROVIDED WITH TWO SELECTIVELY USEABLE
DRIVE MECHANISMS FOR THE FEED ROLLS
Filed Jan. 28, 1957   8 Sheets-Sheet 8

INVENTOR
EDWARD E. FRANKS JR.
BY Teller + McCormick
ATTORNEYS

United States Patent Office 2,923,343
Patented Feb. 2, 1960

2,923,343

LENGTH MEASURING AND CUTTING MEANS FOR SPRING COILING MACHINE PROVIDED WITH TWO SELECTIVELY USEABLE DRIVE MECHANISMS FOR THE FEED ROLLS

Edward E. Franks, Jr., Litchfield, Conn., assignor to The Torrington Manufacturing Company, Torrington, Conn., a corporation of Connecticut Application January 28, 1957, Serial No. 636,548

20 Claims. (Cl. 153—65)

This invention relates to a spring coiling machine of the type wherein means is provided for longitudinally feeding a wire against a substantially stationary coiling abutment which serves to bend or coil said wire around a stationary anvil so that the wire is stressed for forming a coil spring and wherein a device is provided for cutting the wire after it is bent or coiled so as to sever most of the bent or coiled spring forming portion of said wire from the main body thereof.

One of the objects of the invention is to provide a machine of the type stated, wherein an actuating means is provided for said cutting device which derives its power independently of the power means for effecting feeding, and wherein said independent actuating means for the cutting device is automatically operated upon the completion of the spring.

Another object of the invention is to provide an apparatus for measuring the extent of wire feeding, this measuring apparatus being separate from the feed rolls. Said measuring apparatus may be utilized to stop the feed rolls after a predetermined length of wire has been fed, and when the measuring apparatus is so used it may also serve to affect the actuation of the wire cutting device upon the completion of the spring.

Another object of the invention is to provide a machine which is adapted to operate in either of two ways. Two alternately useable drive mechanisms are provided for the feed rolls, a first mechanism including an engageable and disengageable clutch and a second mechanism including an oscillating gear segment and a unidirectional clutch. Selectively useable means are provided for connecting either of said mechanisms for driving the feed rolls. For the first said mechanism a suitable means is provided for disengaging the clutch to stop feeding after feeding to a predetermined extent and for the second said mechanism the extent of feeding is determined by the cyclical mechanical operation of the mechanism.

When the machine is adapted to operate in either of two ways, the extent of feeding for each spring may be determined alternatively by said measuring device, as before stated, or the extent of feeding for each spring may be determined by the mechanical cyclic action of the machine, as before stated. When the measuring apparatus is used with the first mechanism to determine the extent of feeding, said apparatus preferably also serves to effect the actuation of the wire cutting device. When the extent of feeding is determined mechanically by the second mechanism, a cam shaft is preferably used to effect the actuation of the wire cutting device.

When the second said drive mechanism of the machine is being used, the measuring apparatus may be utilized to check the extent of the feeding by the mechanical means.

While the invention in its broader aspects is not so limited, the machine shown is particularly adapted for the making of spiral coil springs formed from flat wire and of the type disclosed in the Foster Patent No. 2,609,- 191 and in the Lermont Patent No. 2,609,192, both dated September 2, 1952.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

Fig. 1 is a front view of a spring coiling machine embodying the invention.

Fig. 2 is an enlarged front view of the final horizontal wire guides and the coiling anvil as shown in Fig. 1.

Fig. 3 is a plan view of the parts as shown in Fig. 2.

Fig. 4 is a right end view of the parts shown in Figs. 2 and 3.

Fig. 5 is a transverse sectional view taken along the irregular line 5—5 of Fig. 1. For simplicity the parts beyond the section line are omitted from this view and from other sectional views.

Fig. 6 is a fragmentary view similar to the upper right portion of Fig. 5 but showing an alternative gear arrangement.

Fig. 10 is an enlarged plan view of the press taken in the direction of the arrows, 10, 10 in Fig. 1.

Fig. 11 is a fragmentary transverse sectional view on the same scale as Fig. 10 and taken along the lines 11—11 of Figs. 1 and 10.

Fig. 12 is a fragmentary longitudinal sectional view taken along the line 12—12 of Fig. 10.

Fig. 12A is an enlarged vertical sectional view taken along the line 12A—12A in Fig. 10.

Fig. 12B is a view taken in the direction of the arrows 12B, 12B in Fig. 12A.

Fig. 12C is a view taken in the direction of the arrows 12C, 12C in Fig. 12A.

Fig. 13 is an enlarged view of the mechanism for adjusting and moving the wire bending abutment, the cam and immediately associated parts being shown out of proper timed relationship for convenience of illustration.

Fig. 14 is a fragmentary view taken in the direction of the arrows 14, 14 in Fig. 13.

Fig. 15 is an enlarged view of the mechanism for adjusting and moving the back bending tool, the cam and immediately associated parts being shown out of proper timed relationship for convenience of illustration.

Fig. 16 is a fragmentary view taken in the direction of the arrows 16, 16 in Fig. 15.

Fig. 17 is an enlarged front view of a portion of the wire measuring apparatus forming a part of the machine.

Fig. 18 is a transverse sectional view taken along the line 18—18 of Fig. 17.

Fig. 19 is a plan view of the portion of the measuring apparatus as shown in Fig. 17.

General organization and feed rolls

Figure 8:
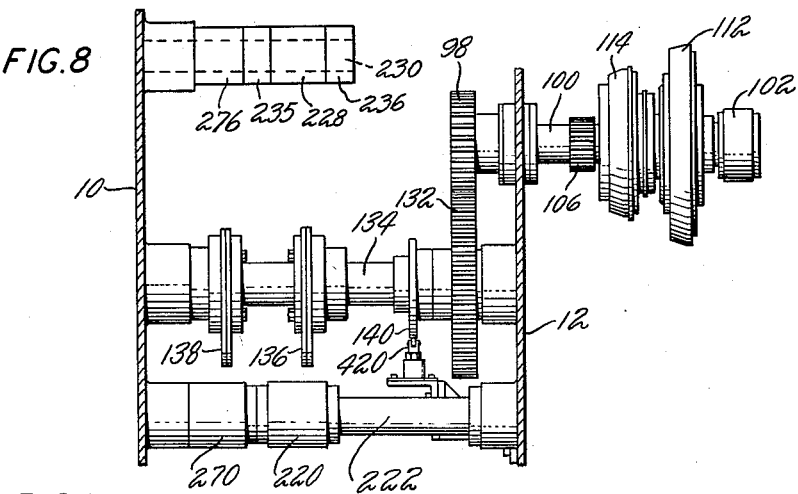
Fig. 8 is a fragmentary transverse sectional view taken along the line 8—8 of Fig. 1.

Referring more particularly to Figs. 1 to 9 of the drawings, a machine embodying the invention comprises a main frame which is shown as having front and rear plates 10 and 12 each having transverse flanges 13, 13 at its ends, a base 14 and preferably a top cover 15. Said front and rear plates 10 and 12 are provided with various bosses and other means which serve as supports or bearings for various shafts and the like which will be described. Unless otherwise stated, all of the shafts extend transversely, that is, in a direction perpendicular to said plates.

With the particular arrangement shown, the wire to be coiled to form springs is drawn from a suitable reel, not shown, at the right and is fed from right to left by means of first lower and upper feed rolls 16, 17 and by means of second lower and upper feed rolls 18, 19. The position of the wire as it is drawn from the coil is indicated at W. Suitable wire guides 20, 22 and 23 are provided for the horizontally moving wire. Mechanism hereinafter described in detail is provided at the left of the guides 23 and immediately adjacent said guides for engaging the wire to coil it as it is fed toward the left. This means includes a coiling or bending abutment 24 which serves to coil or bend the wire around an arbor or anvil 25, the wire being stressed with the resultant formation of a coil spring such as S. As shown the coil spring S is a spiral spring but the invention as to certain aspects thereof is not so limited. A device is provided for cutting the wire after bending and after completion of the springs. The cutting device serves to separate most of the stressed portion of the wire, including the spring, from the main body of said wire.

The machine as shown is adapted for bending or coiling flat wire and said wire is prevented from immediate coiling and it is guided transversely and preferably upwardly along a fixed substantially straight path with the eventual formation of a spiral coil spring S at a spaced and preferably elevated position. The said device for cutting the wire is a press 26 hereinafter described in detail.

Preferably, and in accordance with one phase of the invention, a wire engaging device 27 is provided which is separate from the feed rolls and which constitutes a portion of a wire measuring apparatus to be hereinafter fully described. The measuring apparatus may serve to control the operation of the feed rolls and it may also serve to control the operation of the cut off device or press 26. Said wire engaging device 27 of said measuring apparatus is so positioned at the right that it engages the wire before it is engaged by the feed rolls.

When the machine is to be used for feeding flat wire, the said final guides 23 are preferably constructed as shown in detail in Figs. 2, 3 and 4. A relatively large bracket 28 is provided for supporting the final guides 23. Supported on the bracket 28 are crossbars 29, 29 and a horizontal plate 30 is provided below the crossbars and held by screws 31, 31. Extending along the bottom of the guide plate 30 and at the front and rear sides thereof are longitudinal rails 32, 32, said rails being connected with the upper plate by screws 33, 33. A lower guide plate 34 is provided below the upper plate 30, being spaced therefrom by approximately the thickness of the wire. The plate 34 is connected to the rails 32, 32 by screws 35, 35 that extend through slots in said rails. By loosening the last said screws, the said lower guide plate can be relatively upwardly or downwardly adjusted for different thicknesses of wire.

The lower guide plate 34 has the same width as the wire. For wire of a different width, the plate 34 is replaced by a plate that is wider or narrower, but otherwise similar. The screws 31, 31 that hold the rails 32, 32 are in slots in the upper guide plate 30 and said rails can therefore be adjusted to accommodate the width of the lower guide plate 34.

Preferably the left portion of the upper guide is a separate plate 36 connected by screws to the rails 32, 32. This plate 36 has a rounded end portion which constitutes the said anvil 25 about which the wire is bent or coiled by the bending or coiling abutment 24. The anvil portion 25 of said plate 36 is subject to wear and the plate can be readily replaced when worn.

The first lower feed roll 16 is carried by a shaft 37 mounted in bearings on the front and rear plates 10 and 12. The feed rolls are shown as being relatively wide so as to be adapted for engaging and feeding wide flat wire. When the rolls are wide, a bracket 38 is preferably provided which carries an auxiliary bearing 39 for the shaft 37 at the front of the roll 16.

The first upper feed roll 17 is carried by a short shaft 40 mounted in front and rear bearings in a vertically movable slide 42 movable along guideways on a bracket 44 secured to the front frame plate 10. The slide 42 and the roll 17 carried thereby are biased downwardly by a leaf spring 46. The spring serves to maintain a suitable pressure between the upper roll 17 and the lower roll 16 so that the wire is firmly engaged and is fed at the speed of roll rotation. The tension of said spring may be adjusted by means of a screw 48 and a handwheel 50. A shaft 52 is provided in approximate alignment with the shaft 40, said shaft being mounted in two bearings, one carried directly by the rear plate 12 and the other carried by a bracket 53 secured to said rear plate. Said shafts 52 and 40 are connected by universal joints 54, 54 which transmit power but which nevertheless permit limited vertical movements of the upper roll 17 and its shaft 40. Meshing gears 56 and 58 respectively connected with the shafts 37 and 52 serve to rotate the shaft 52 in unison with the shaft 37. The shaft 52 is rotated at the same speed but in the opposite direction, thus effecting rotation of the upper roll 17 at the same speed as the lower roll 16 but in the opposite direction.

Power for rotating the feed rolls is transmitted thereto by means of a gear on a shaft 60 at the rear end thereof, said shaft being mounted in bearings on the frame plates 10 and 12. The last said gear may be driven by means of said shaft or otherwise, all as hereinafter fully explained. The gear at the rear of said shaft 60 is interchangeable with another gear, as hereinafter explained. One gear 62 is shown in Fig. 5, said gear meshing with a gear 64 secured to said shaft 37 and therefore said gear 62 drives the first lower and upper feed rolls.

Shafts and other parts for supporting and rotating the second feed rolls 18 and 19 are provided which are duplicates of the shafts and other parts for the first feed rolls 16 and 17. Said duplicate parts include shafts 66 and 68 similar respectively to the shafts 37 and 40 and a vertically movable slide 70 similar to the slide 42. Some of said duplicate parts are not shown. A detailed description of said duplicate parts is unnecessary. At the rear of the shaft 66 is a gear which is a duplicate of the gear 64, but which is not shown. Said duplicate gear also meshes with the gear 62 and said gear 62 therefore serves to drive all of the feed rolls.

Power for operating the feed rolls and for other purposes is supplied through a main drive shaft 72 which is located near the bottom of the machine and is supported in bearings in the front and rear plates 10 and 12 and in an outboard rear bearing 73 in a bracket secured to the base 16. Any suitable driving means may be provided for said shaft 72, but as shown a sprocket wheel 74 is rotatable on the shaft between the rear plate 12 and the outboard bearing 73, said sprocket wheel being connectible with the shaft by a clutch 76, which can be engaged or disengaged by a manually movable shipper 77. A chain 77ᵃ passes around the sprocket wheel and transmits power from a variable speed mechanism, not shown, said variable speed mechanism being driven by an electric motor 78 which is shown only in the electrical diagram in Fig. 20. Adjacent the main drive shaft 72 is a secondary drive shaft 79 connected with the main shaft by gears 80 and 82 in a housing 84. The gears 80 and 82 may be transposed or other gears may be substituted to change the speed of the secondary shaft 79 with respect to the speed of the main shaft 72.

The secondary drive shaft 79 carries a pinion 86 which meshes with a drive gear 88 which is carried by a bearing 90 on a short stub shaft 92. The stub shaft is held in a boss 94 on the rear plate 12.

In accordance with one phase of the invention, two alternatively usable drive mechanisms are provided for transmitting power from the shaft 72 and the gear 88 to the feed roll shafts 37 and 66. One drive mechanism, hereinafter called the first drive mechanism, transmits power to continuously rotate the feed roll shafts and the feed rolls. The other drive mechanism, hereinafter called the second drive mechanism, transmits power to intermittently rotate the feed roll shafts and the feed rolls.

*First drive mechanism for feed rolls*

The first said drive mechanism is shown in Figs. 1 and 5 and it includes a gear 96 fixedly connected with the gear 88 for rotation therewith. Said gear 96 meshes with a gear 98 carried by and rotatable with a shaft 100. The shaft 100 is suported in part by a bearing in a boss on the rear plate 12 and in part by a boss 102 on a bracket 104 secured to said rear plate 12. Carried by the shaft 100 and rotatable thereon is a pinion 106 which meshes with an idler gear 108 rotatable on a stud 110 carried by said rear plate 12. The pinion 106 may be operatively connected with said shaft 100 by means of a clutch 112, preferably electrical, or said pinion 106 may be held stationary by means of a brake 114, preferably electrical.

The idler gear 108 is shown as meshing with the said gear 62 on the shaft 60, which gear 62 is relatively wide to permit such meshing. The gear 62 meshes with the gears 64 on the feed roll shafts 37 and 66 and this completes the train of power connections from the shaft 72 and the gear 88 to said feed roll shafts and constitutes the first drive mechanism. In order that the feed rolls may be rotated in the proper directions for feeding, the gear 88 is rotated in the counterclockwise direction, this corresponding to rotation of the main drive shaft 72 in the counterclockwise direction.

The clutch 112 and its associated brake 114 constitute, together with the wire measuring apparatus to be described, means for stopping feeding after a predetermined length of wire has been fed, this means being used when the said first drive mechanism is connected to drive the feed rolls.

*Second drive mechanism for feed rolls*

Figure 7:
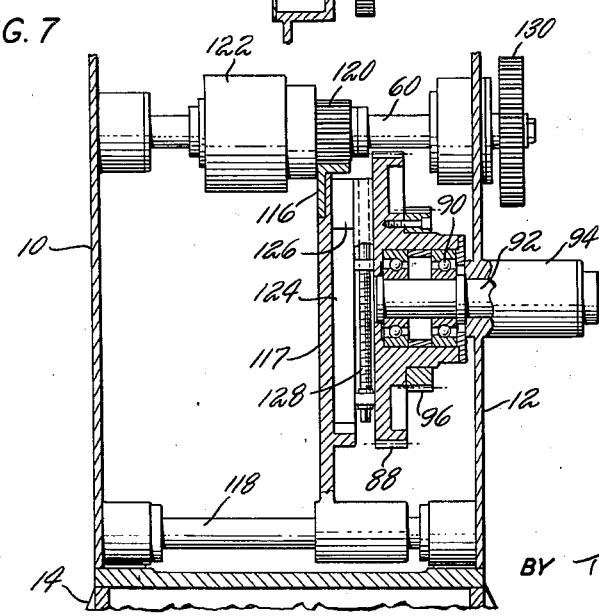
Fig. 7 is a fragmentary transverse sectional view taken along the line 7—7 of Fig. 1.

The second said drive mechanism between the shaft 79 and the gear 88 and the feed roll shafts is shown in Figs. 1 and 7. A gear segment 116 is located adjacent the gear 88 and at the front thereof, said segment having a radial arm 117 which is carried by a rockshaft 118 mounted in bearings in the front and rear frame plates. The gear segment 116 meshes with a gear 120 on said shaft 60, the gear being connected with the shaft by a unidirectional clutch 122. The radial arm 117 of the segment has a radial groove 124 and the gear 88 carries a normally eccentric roller 126 which enters and fits said groove. The roller is adjustable relatively to the gear 88 by means of a screw 128, and by rotation of the screw the extent of roller eccentricity can be changed. With the roller 126 in an eccentric position, the gear segment is caused to make one oscillation during each gear rotation, and as the segment oscillates it rotates the gear 120 successively in opposite directions and the unidirectional clutch operates the shaft 60 in only one direction.

The shaft 60 is connected with the gear 64 and the duplicate thereof on the shaft 66 by a gear 130 which is similar to the before-described gear 62 except that it is narrower to avoid meshing with the gear 108. The gear 130 is shown in Figs. 6 and 7. As will be apparent from Fig. 1, the clutch 122 is so constructed and connected that the shaft 60 is operated only in the clockwise direction which corresponds to rotation of the feed rolls in their feeding direction. Said shaft and the feed rolls are therefore operated intermittently. The extent and speed of rotation of the shaft 60 and of the feed rolls during each rotation of the gear 88 can be changed by changing the eccentricity of the roller 126.

The automatically oscillating gear segment 116 with its associated parts constitutes means for stopping feeding during each cycle after a predetermined length of wire has been fed.

When the said second drive mechanism is not to be used, the roller 126 is adjusted to its central position so that it does not oscillate the gear segment 116. The gear 130 is replaced by the gear 62 as shown in Fig. 5. Said gear 62 rotates the shaft 60 in the feeding direction, and the clutch 122 permits such rotation.

*Cam shaft and operating mechanism therefor*

As shown in Figs. 1 and 8, said gear 98 not only meshes with the gear 96 but also meshes with a gear 132 on a cam shaft 134 mounted in bearings on the front and rear frame plates. The gear 132 has the same number of teeth as the gear 96 and the cam shaft is therefore rotated at the same speed as the gear 96 and the gear 88. The cam shaft 134 is rotated continuously by the gear 98, being so rotated whether the feed rolls are operated continuously by the first drive mechanism or are operated intermittently by the second drive mechanism. When the second drive mechanism is in use, the cam shaft 134 makes one rotation during each oscillation of the segment 116, that is, one rotation during each machine cycle. The cam shaft 134 carries three cams 136, 138 and 140, the functions of which will be hereinafter described.

*Handwheel mechanism for set-up*

Figure 9:
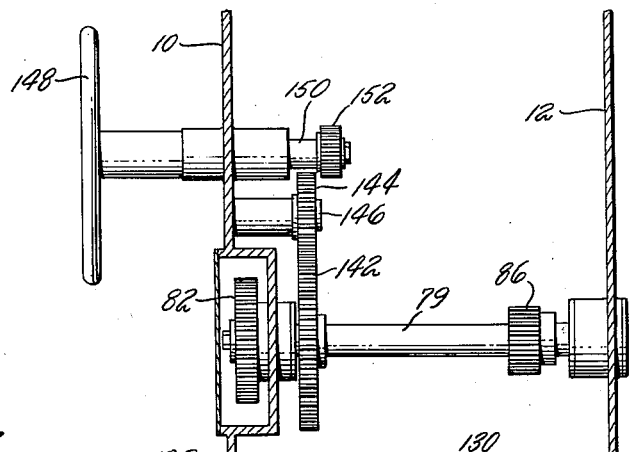
Fig. 9 is a fragmentary transverse sectional view taken along the line 9—9 of Fig. 1.

As shown in Figs. 1 and 9, a mechanism may be provided for manually operating the machine or parts thereof for set-up or other purposes. As shown, the secondary drive shaft 79 carries a gear 142 which meshes with an idler gear 144 on a stud 146 carried by the front frame plate 10. A handwheel 148 is carried by a shaft 150 longitudinally movable in a bearing on the front frame plate 10. A pinion 152 is provided at the inner or rear end of the shaft 150. When the parts are in the positions shown in Fig. 9, the handwheel is idle. The handwheel 148 and the shaft 150 can be moved forwardly to cause the pinion 152 to mesh with the idler gear 144. When the pinion so meshes, the handwheel can be used to slowly move all of the parts, including the feed rolls, that have geared connection with said shaft 79.

*Means for Bending and Guiding Wire to Form Coil*

The coiling or bending abutment 24 is supported on a bracket 154 on the front frame plate 10 and said abutment 24 may be stationary during bending of the wire. The wire W to be coiled may be flat and relatively wide, and the machine is primarily adapted for the bending and eventual coiling of such wire, the wire being fed toward the left by the feed rolls. As the wire W engages the bending abutment 24, it is bent sharply around the anvil 25, ordinarily upwardly, to a position such as shown at W$^a$ and it is thereafter guided upwardly as hereinafter explained.

As the wire W moves upwardly it is under stress tending to coil it in the clockwise direction, such coiling stress resulting from the sharp bending that has taken place at the bending abutment 24 and around the anvil 25. However, the wire is so guided that coiling thereof cannot immediately take place. For this purpose there are provided lower and upper guides 158 and 160 which engage the wire to guide it in a substantially straight path and prevent immediate coiling. The said substantially straight path of the wire is at an angle to the line of wire movement to said anvil 25, and said path preferably extends upwards and slightly toward the right. A space is preferably provided between said guides for a reason to be stated. Beyond the upper guide 160 the wire passes at W$^b$ between tool holders 164 and 166 of the before-mentioned press 26. Beyond said tool holders and at the end of said substantially straight path the wire is released so that it is free to coil so as to form a spiral coil S. Said spiral coil is supported on a platform 168 and it builds up gradually to a suitable maximum size to constitute the spring S as shown. As soon as the coil starts to form, the stress in the wire W thereof exerts a downward pressure against the platform 168 and this results in tension in the wire W at the portions W$^a$ and W$^b$ thereof. The coil spring S, formed as stated, may be of the type disclosed in the aforesaid Foster and Lermont patents.

A back bending tool 170 is preferably provided in association with said guides 158 and 160, said tool being above the bending abutment 24 and below the cutting device or press 26. Said tool 170 engages the wire at the same side thereof as said bending abutment and it engages the wire W between the lower guide 158 and the upper guide 160. The tool cooperates with said guides to reversely bend the wire W to a limited extent, thus reducing the coiling stress therein.

Wire cutting device or press

When the coil or spring S has attained a predetermined size, wire feeding is stopped and the device or press 26 is operated to cut the wire. In accordance with one phase of the invention, the wire cutting device is actuated by a power means separate from and additional to the main power shaft 72. The cutting device is automatically actuated upon the completion of the spring.

When the wire, after bending, is guided for movement along a substantially straight path as shown, the cutting device or press preferably serves to cut the wire at a position along said wire path, ordinarily near the top of said path. The cutting device or press severs most of the bent or stressed portion of said wire from the main body thereof and separates the completed coil or spring S and prepares for the starting of the next following coil.

The press 26 is shown generally in Fig. 1 and in detail in Figs. 10, 11 and 12. Said press is carried by a bracket 172 mounted on the main frame of the machine. Said bracket preferably has an inclined upper face perpendicular to the inclined wire portions W$^a$ and W$^b$. The main frame 174 of the press is secured to said bracket 172 at said upper inclined face thereof, and said frame includes a forwardly projecting portion 174$^a$ having an upper face which constitutes said platform 168. Said frame portion 174$^a$ carries a bolster plate 175, which supports the stationary tool or die holder 164. The tool or punch holder 166 is movable toward and from the stationary die holder 164 and it is carried by a slide or gate 176 guided on the main press frame 174. As shown, dowel pins 178 are provided on the stationary die holder 164 and bolster plate 175 and these extend through and fit holes in the movable punch holder 166. As shown in Fig. 11, the movable tool holder 166 has a stem 179 by means of which it is clamped to the slide 176. The press or cutting device has an initial idle position as shown in Fig. 10.

Mounted in suitable bearings in the press frame 174 is a transverse shaft 180. Rotatable on said shaft 180 near the rear end thereof is a flywheel 182 having peripheral grooves. An electric motor 184 is mounted on said frame 174, said motor carrying a grooved pulley 186. A belt 188 passes around said pulley 186 and also around the flywheel 182, said belt entering the grooves in said pulley and flywheel. The motor 184 is continuously operated and the flywheel 182 is therefore continually rotated. The motor 184 is free from actuating connection with any other portion of the machine.

The shaft 180 is provided with an eccentric portion 190, and a connecting rod 192 engages said eccentric portion and is pivotally connected with said slide 176. When the shaft 180 is rotated, the connecting rod 192 reciprocates the slide 176 to move the tool holder 166 toward and away from the tool holder 164.

Preferably and as shown in Figs. 10 and 12, the connecting rod 192 is provided with an eccentric sleeve 194 which is rotatably adjustable relatively to said rod. The sleeve 194 has a notched flange 196 and a finger 198 held in place by screws 200 enters a notch in the flange 196 to maintain the sleeve in adjusted position. By rotatably adjusting the sleeve 194 the limits of reciprocation of the slide 176 and of the tool holder 166 can be changed.

At the rear end of the press shaft 180 and rotatable therewith is an electrically controlled clutch 202. The clutch may be pneumatically operated under electrical control, but the present invention does not involve the type of clutch nor the specific control thereof. Normally the clutch is not engaged and the flywheel 182 rotates independently of the clutch and of the shaft. However, when the clutch 202 is engaged it causes the shaft to rotate with the flywheel 182 and to thus move the movable jaw 166.

At the front end of the press shaft 180 is an electrically controlled brake 204. The brake may be pneumatically operated under electrical control, but the present invention does not involve the type of brake nor the specific control thereof. The said brake 204 has a stationary member 206 secured to the frame 174 and a rotatable member secured to said shaft 180. Normally the brake is engaged and the rotatable member thereof contacts the stationary member 206 to prevent rotation of the shaft 180. When the brake is released, the shaft 180 is free to be turned upon actuation of the clutch 202.

Tools, not shown in Fig. 1 but shown schematically in Fig. 10 and in greater detail in Figs. 12A and 12B, are carried by the die and punch holders 164 and 166 and these tools may be dies and punches which cooperate to cut or sever the wire W when said holder 166 is moved toward the right. Said holder 166 constitutes the movable tool carrying member of the press. Said holder 166 is movable rectilinearly in a direction perpendicular to said inclined portion of the wire. The same dies and punches or other tools on the holders 164 and 166 may punch holes in the severed wires near the ends thereof or may otherwise shape the end portions of the severed wires. Said holes or other formings may be in the outer end portion of the completed springs or in the inner end portion of the spring about to be coiled or in both.

The invention does not relate to the details of the tooling on the tool holders 164 and 166 and such details may be widely varied. However, as an example, one suitable tooling is shown in Figs. 10, 12A, 12B and 12C.

Referring more particularly to Figs. 12A and 12B, a plate 166$^a$ is secured to the punch holder 166, and this plate carries a punching tool 166$^b$ which serves to cut or sever the wire W$^b$ in such manner that curved ends are provided on the trailing portion of the completed spring and on the leading portion of the next spring. The plate 166$^a$ also carries two round punches 166$^c$, 166$^c$ positioned and adapted to cut two round holes, one in the trailing portion of the completed spring and the other in the leading portion of the next spring.

Referring more particularly to Figs. 12A and 12C, a die plate 164$^a$ is secured to the die holder 164, and this plate has a die opening which is accurately shaped to receive and fit the punching tool 166$^b$. Said plate 164$^a$ also has holes 164$^b$, 164$^b$ which receive and fit the round punches 166$^c$, 166$^c$. Preferably, said opening in the plate 164$^a$ has a pressure pad 164$^c$ therein, which pad may approximately fit said opening. Springs 164$^d$, 164$^d$ bias the pad 164$^c$ toward its forward or left position as shown in Fig. 12A. When the punching tool 166$^b$ enters the opening in the die plate 164$^a$, the pad 164$^c$ yields, but as the tool 166$^b$ is withdrawn, said pad returns the severed punching to the plane of the front face of the die plate from which position it is removed by the next advancing movement of the wire W$^b$. The plate 164$^a$ carries a stripper plate 164$^e$ which prevents movement of the wire W$^b$ toward the left with the tools 166$^b$ and 166$^c$. This stripper plate cooperates with the die plate 164$^a$ to constitute means for guiding the wire in a substantially straight path.

The cutting and punching tools are substantially spaced from the ends of this path.

Electrical controls are provided for the clutch and for the brake as hereinafter more fully explained. The brake 204 is de-energized when the clutch 202 is energized and said brake is energized when said clutch is de-energized. The electrical controls are such that the shaft 180 makes one rotation at the end of each machine cycle. By reason of said rotation of the shaft, the cutting device is first moved out of its said initial position so as to effect cutting and the movement of said cutting device is stopped after said device has completed its cutting action and has returned to its initial position. Said electrical controls will be fully explained in connection with the diagram of electrical connections. The electrical controls for the clutch and brake include a switch 208 on the press frame 174 which switch is actuated by a member 210 on the connecting rod 192. This switch serves to stop rotation of the shaft 180 with the cutting device in its said initial position, that is, with the movable holder 166 in a predetermined retracted position. The switch 208 is only momentarily opened and is then automatically returned to its closed position.

*Mechanism for adjusting and moving bending abutment*

The extent of the coiling stress in the wire W as it is guided upwardly by the guides 158 and 160 varies with the distance of the coiling or bending abutment 24 from the anvil 25. This stress is very substantial when the bending abutment is close to said anvil and it is less when the bending abutment is farther from said anvil. It will be apparent that the characteristics of the spring may be varied by adjusting or moving the bending abutment. Said bending abutment is therefore preferably so mounted that it is adjustable longitudinally at least for purposes of setup. Furthermore, provision may also be made for longitudinally moving said bending abutment 24 during bending and coiling.

The mechanism for adjusting and moving the bending abutment is shown in Figs. 13 and 14. The bending abutment 24 is preferably carried by a slide 212 which is guided on the bracket 154 for longitudinal movement. As shown, the abutment 24 is secured by means of screws 213, 213 to a holder 214 which in turn is secured to said slide 212. Preferably, the holder 214 and the bending abutment 24 are angularly adjustable relatively to the slide 212 and about a vertical axis. As shown, a pivot pin 214ᵃ is carried by the slide 212 and fits a hole in the holder 214. Screws 214ᵇ, 214ᵇ serve when turned to adjust the holder about the axis of the pin. The holder may be clamped in adjusted angular position by screws 214ᶜ, 214ᶜ.

The abutment 24 may be longitudinally adjusted by correspondingly adjusting the slide 212, and adjustment toward the right may be effected by means of a screw 216. As shown, the slide is free to move toward the right independently of the screw, but the screw serves as a stop to limit movement toward the left. The pressure of the wire W against the abutment during bending always biases said abutment and the slide 212 toward the left and the slide may be additionally so biased by supplemental means to be described. The positions of said bending abutment and of said slide may be predetermined by the adjustable stop screw 216. A suitable clamping means may be provided to lock the slide in a fixed position.

It is sometimes desirable to adjust the bending abutment during bending and for this purpose the cam 136 on the shaft 134 is utilized. As shown in Fig. 13, a lever 218 is provided below the cam 136, said lever having a hub 220 on a transverse pivot rod 222 carried by the front and rear plates 10 and 12 and said lever having a roller 224 which engages said cam 136. A lever 226 is provided below the lever 218, said lever having a hub 228 on a transverse pivot rod 230 and said lever having an abutment 232 which projects upwardly and engages said lever 218. The abutment 232 is preferably adjustable longitudinally of the lever 226 by means of a screw 234. Said pivot rod 230 and said hub 228 are shown in Fig. 8, the rod projecting rearwardly from a boss on the front frame plate 10. The rod 230 carries a second hub 276, hereinafter more fully described, and said hubs 228 and 276 are spaced apart by a collar 235. A collar 236 secured to said pin 230 near the rear end thereof prevents rearward movement of said hubs.

A transverse rockshaft 237 is provided below the slide 212, said shaft having a front bearing in said bracket 154. The rockshaft carries an arm 238 which projects upwardly and is connected with said slide 212 by means of a link 240. An arm 242 is carried by the rockshaft 237 behind the front plate 10, said arm being approximately in vertical register with the lever 226. The arm 242 is provided with a rockpin 244 and a rod 246 extends through an aperture in said pin and is pivotally connected at its lower end to the lever 226. The upper portion of the rod 246 is threaded and said portion engages a threaded sleeve 248 controlled by a handwheel 250. The lower end of the sleeve 248 abuts against said rockpin 244. The rockshaft 237 also carries an arm 252 engaged by a tension spring 254 the lower end of which spring is connected with one of the flanges 13. The spring 254 biases the shaft 237 for counterclockwise movement, and said shaft is so moved to the extent permitted by the sleeve 248 and the rod 246. Tension in the rod 246 holds the lever 226 in position with the abutment 232 engaging the lever 218 and the pressure of said abutment holds the lever 218 in position with its roller 224 engaging the cam 136. When the cam 136 and the associated parts are not being used for moving the coiling abutment during coiling, the spring 254 constitutes the before-mentioned supplemental means for biasing the slide 212 for movement toward the left as limited by the screw 216.

It will be seen that as the cam 136 is rotated the lever 218 is oscillated with resultant oscillation of the lever 226 and with resultant oscillation of the rockshaft 237. The last said shaft as it oscillates effects longitudinal reciprocation of the slide 212 and of the bending abutment 24. It will be understood that the shape of the cam 136 as shown in Fig. 13 is merely schematic and that the drawing is not intended to represent any actual cam shape, and it will be further understood that for convenience of illustration the cam 136 and the directly associated parts are shown out of proper relationship with the slide 212. The extent of reciprocation of the bending abutment can be changed by adjusting the abutment 232 along the lever 220. By turning the handwheel 250 and the sleeve 248, the limits of reciprocation can be changed, without changing the extent of reciprocation.

The cam shaft 134 and the described mechanism for moving the bending abutment during bending are utilized only when the said second drive mechanism is in use. With such mechanism in use, the machine has one cycle for each rotation of the gear 88 and for each reciprocation of the segment 116. The cam shaft 134 makes one rotation during each cycle and the bending abutment makes one reciprocation during each cycle.

*Mechanism for adjusting and moving back bending tool*

As previously stated, the back bending tool 170 serves or may serve to reversely bend the wire W to a limited extent after it has been bent and stressed by the coiling or bending abutment 24. The tool 170 serves to reduce the coiling stress in the wire and it reduces said stress to different extents according to its position with respect to the guides 158 and 160. It will be apparent that the characteristics of the spring may be varied by adjusting or moving the back bending tool. Said tool is therefore preferably so mounted that it is adjustable longitudinally at least for purposes fo set-up. Furthermore, provision may also be made for longitudinally moving back bending tool 170 during operation of the machine.

The mechanism for adjusting and moving the back bending tool is shown in Figs. 15 and 16. The back bending tool 170 is preferably carried by a slide 256 which is guided for longitudinal movement along a block 257 on a bracket 258 secured to the front frame plate 10. As shown, the tool 170 is secured to a holder 260 which in turn is secured to said slide. The slide 256 carries a transverse stud 262 and the holder 260 is angularly adjustable on the stud, being clamped in adjusted position by a screw 264. This pivotal adjustment of the holder and tool makes its possible to vertically adjust the wire engaging portion of the tool. The back bending tool may be longitudinally adjusted by correspondingly adjusting the slide 256, and adjustment toward the right may be effected by means of a screw 266. As shown, the slide is free to move toward the right independently of the screw, but the screw serves as a stop to limit movement toward the left. When the tool is in use, pressure of the wire always biases said tool and also the slide 256 toward the left and the slide may be additionally so biased by supplemental means to be described. The positions of said tool and of said slide may be determined by the adjustable stop screw 266. A suitable clamping means may be provided to lock the slide in a fixed position.

It is sometimes desirable to adjust the back bending tool during operation of the machine and for this purpose the cam 138 on the shaft 134 is utilized. As shown in Fig. 15, a lever 268 is provided below the cam 138, said lever having a hub 270 on the said transverse pivot rod 222 and said lever having a roller 272 which engages said cam 138. A lever 274 is provided below the lever 268, said lever having the before mentioned hub 276 on the said transverse pivot rod 230 and said lever having an abutment 278 which projects upwardly and engages said lever 268. The abutment 278 is preferably adjustable longitudinally of the lever 274 by means of a screw 280.

A transverse rockshaft 282 is provided below the slide 256, said shaft having a front bearing in said bracket 258. The rockshaft carries an arm 284 which projects upwardly and is connected with said slide 256 by means of a link 286. An arm 288 is carried by the rockshaft 282 behind the front plate 10, said arm being approximately in vertical register with the lever 274. The arm 288 is provided with a rockpin 290 and a rod 292 extends through an aperture in said pin and is pivotally connected at its lower end to the lever 274. The upper portion of the rod 292 is threaded and said portion engages a threaded sleeve 294 controlled by a handwheel 296. The lower end of the sleeve 294 abuts against said rockpin 290. The rockshaft 282 also carries an arm 298 engaged by a tension spring 300 the upper end of which spring is connected with a stationary bracket 302. The spring 300 biases the shaft 282 for counterclockwise movement, and said shaft is so moved to the extent permitted by the sleeve 294 and the rod 292. Tension in the rod 292 holds the lever 274 in position with the abutment 278 engaging the lever 268 and the pressure of said abutment holds the lever 268 in position with its roller 272 engaging the cam 138. When the cam 138 and the associated parts are not being used for moving the back bending tool during coiling, the spring 300 constitutes the before-mentioned supplemental means for biasing the slide 256 toward the left as limited by the screw 266.

It will be seen that as the cam 138 is rotated the lever 268 is oscillated with resultant oscillation of the lever 274 and with resultant oscillation of the rockshaft 282. The last said shaft as it oscillates effects longitudinal reciprocation of the slide 256 and of the back bending tool 170. It will be understood that the shape of the cam 138 as shown in Fig. 15 is merely schematic and that the drawing is not intended to represent any actual cam shape, and it will be further understood that for convenience of illustration the cam 138 and the directly associated parts are shown out of proper relationship with the slide 256. The extent of reciprocation of the back bending tool can be changed by adjusting the abutment 278 along the lever 274. By turning the handwheel 296 and the sleeve 294, the limits of reciprocation can be changed without changing the extent of reciprocation.

The cam shaft 134 and the described mechanism for moving the back bending tool during operation are utilized only when the said second power transmitting mechanism is in use. With such mechanism in use, the machine has one cycle for each rotation of the gear 88 and for each reciprocation of the segment 116. The cam shaft 134 makes one rotation during each cycle, and the back bending tool makes one reciprocation during each cycle.

*Wire measuring apparatus*

The before-mentioned wire engaging device 27, constituting a part of the measuring apparatus, is shown in detail in Figs. 17, 18 and 19. This device engages the wire, preferably before the wire enters between the feed rolls, an it is operated in exact accord with the feeding of the wire. An electric counting device connected with said device 27 gives a signal, preferably an electrical signal, upon the completion of the feeding of a predetermined length of wire. When the said first driving mechanism is in use, said signal may be utilized as hereinafter explained for stopping feeding and for operating the press 26. When the second said driving mechanism is in use, the signal from the measuring apparatus may be otherwise utilized as hereinafter explained.

The wire engaging device 27 is carried by a bracket 302 at the right end of the machine. Said device includes a measuring wheel 304 and a pressure wheel 306 which are rotatable about transverse axes and which are so located that they respectively engage the wire W at the bottom and top faces thereof. The measuring wheel 304 is secured to a shaft 308 rotatable in suitable bearings in the bracket 302 and said shaft at its rear end carries a notched disc 310 which is rotatable in unison with the wheel 304.

The pressure wheel 306 is rotatable on a pin 312 which is secured in an arm 314 pivotally connected with the bracket 302 for movement about a laterally offset longitudinal axis at 316. A longitudinal bar 318 is secured to the bracket 302 above the arm 314 and a screw 320 in said bar engages the arm. By means of the screw the arm 314 may be forced downwardly to press the wheel 306 downwardly against a wire W interposed between said wheels 304 and 306. A spring 322 interposed between the bracket and the arm holds the arm in its upper position when no wire is in place.

A transverse roller 324 is carried by the bracket 302 at the right of the wheels 304 and 306. This roller supports and guides the moving wire W, the top of the roller being at the same level as the top of the measuring wheel 304. The length of the roller is at least equal to the width of the widest wire that the machine is adapted to use. For guiding the wire at the edges thereof are two vertical rollers 326, 326 rotatable on vertical studs 328, 328. Said studs are adjustable transversely along a T-slot 330 in a bar carried by said bracket 302. The rollers 326, 326 can be adjusted in accordance with the width of the wire and they cooperate with the rails 32, 32 of the final guide 23 to maintain the wire in a fixed path.

The disc 310 has peripheral holes or notches which cooperate with a photoelectric detector 332 mounted on a bracket 334 below the bracket 302. The detector 332 has a notch in the housing thereof and said detector is so located that the disc 310 moves through said notch. A light source or lamp is provided in the detector housing at one side of the notch and a photoelectric cell is provided in said housing at the other side of the notch. As the disc 310 is rotated by the moving wire, light impinges on the photoelectric cell as each notch passes between the light and the cell. Electrical impulses are transmitted from the cell to the before-mentioned electric counting device or counter which is indicated at 336 in Fig. 20, and the number of such impulses is exactly proportionate to the length of wire that has passed between the wheels 304 and 306.

As an example, but without limitation, the wheel 304 may have the diameter 3.183" and its periphery is therefore 10.0". The disc 310 may have 100 uniformly spaced notches 334, and there are therefore 100 electrical impulses for each disc rotation. The disc 310 and the wheel 304 rotate in unison and there is therefore one impulse for each 0.10" of wire movement.

The counter 336 of the measuring apparatus does not of itself constitute a part of the invention and it can be of known construction. Said counter serves to count the number of impulses transmitted to it from the photoelectric cell and it acts to transmit an electrical signal after a definite number of impulses which correspond to a predetermined length of wire to be fed by the feed rolls. The signal from the counter serves, as hereinafter explained, to stop the feeding of the wire and cause the operation of the wire cutting device.

The counter 336 has a zero or starting position to which it may be reset and said counter can be manually set so that the required definite number of input impulses after resetting to the starting position corresponds exactly to the length of wire required for a spring to be coiled. The counter can be reset, as stated, and for this purpose there is preferably provided an electrical control operated by a remote switch, said switch being operated after the completion of the coiling of a spring as hereinafter explained.

It will be observed that the measuring apparatus operates entirely independently of the feed rolls and is not in any way affected by any possible slippage of the feed rolls with respect to the wire. The apparatus accurately measures the length of the wire actually fed.

*Continuous repetitive operations utilizing clutch*

The machine can be set up and adjusted to drive the feed rolls semi-continuously by means of the first drive mechanism which includes the clutch 112 or to drive the feed rolls intermittently by means of the second drive mechanism which includes the gear segment 116. The manner of operation utilizing the first or clutch mechanism will be first described, it being assumed that the machine will operate continuously in repetitive cycles to make successive springs. Alternatively the machine may be operated to make only one spring and stop, manual starting being required for the next following cycle.

To set up for the clutch manner of operation with automatically repetitive cycles, the gear 62 is put in place as shown in Fig. 5, so as to provide a power connection from the gear 108 to the gears 64. The roller 126 on the gear 88 is adjusted to its central position so that the gear segment 116 has no motion.

As a step in the set up procedure, the counter 336 is manually set to give a signal after the feeding of the length of wire required for the springs to be coiled.

Figure 20:
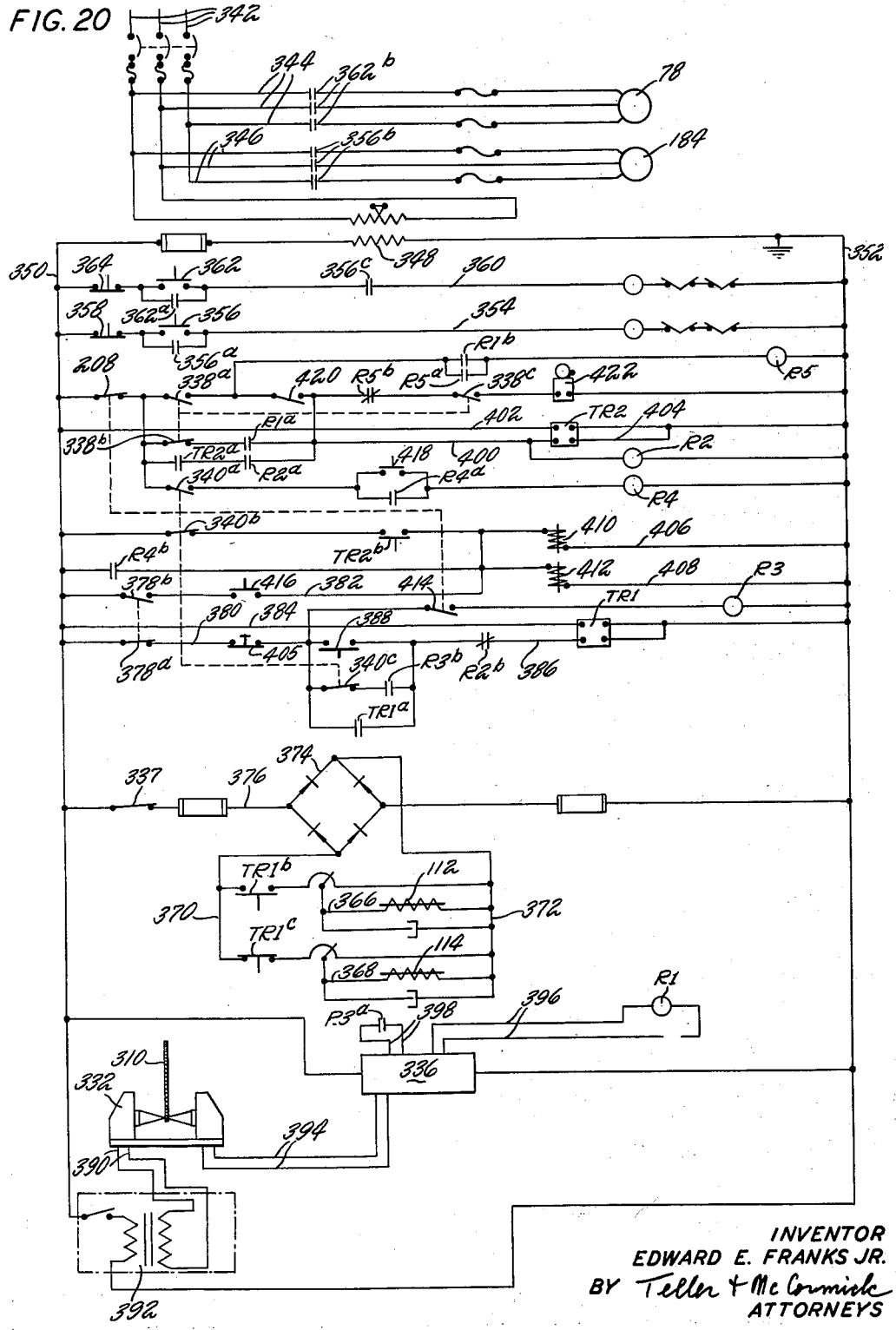
Fig. 20 is a diagram of electrical connections.

As shown in the electrical diagram, Fig. 20, the machine is provided with a manually operable switch 337 and also with mechanically interconnected manually operable switches 338a, 338b and 338c. These switches are hereinafter more fully explained. For clutch operation the switch 337 is closed as shown and the switches 338a, 338b and 338c are respectively open and closed and open as shown. The machine is also provided with mechanically interconnected manually operable switches; 340a, 340b and 340c. These switches are hereinafter more fully explained. For continuous or repetitive clutch operation the last said switches are respectively open and closed and closed as shown.

By means of the screw 216, the coiling or bending abutment 24 is adjusted to a suitable fixed position in accordance with the required characteristics of the spring S to be coiled. The cam operated mechanism shown in Fig. 13 is not used. The bending abutment 24 may also be adjusted angularly when necessary. Such adjustment is ordinarily made after the coiling of one or more sample or test springs. If a test spring has the edges of its convolutions in planes perpendicular to the axis of said spring, no angular adjustment of the coiling abutment is necessary. However, if said edges of the convolutions are in conical arrangement, the coiling abutment is angularly adjusted until the required planar arrangement is attained. The coiling abutment may thus be angularly adjusted about an axis perpendicular to the plane of the wire as it is fed to said abutment, the adjustment of the abutment serving to control the shape of the coil S.

By means of the screw 266, the back bending tool 170 is adjusted to a suitable fixed position in accordance with the required characteristics of the spring S to be coiled. The cam operated mechanism shown in Fig. 15 is not used.

When the coiling motor 78 is operating, power is transmitted through the main shaft 72, the secondary shaft 79, the gear 88, the shaft 100, the clutch 112, the idler gear 108, the gear 62 and the gears 64 to the shafts 37 and 66 which drive the feed rolls. The transmission of power and the feeding of the wire W can be stopped by disengaging the clutch 112 and simultaneously engaging the brake 114. The clutch and the brake are operated by the signal transmitted from the counter 336 after a predetermined length of wire W has been fed. By means of various electrical controls to be described, the machine can be manually started, and after starting the machine will coil a single spring, the clutch 112 and the brake 114 being then automatically operated, as aforesaid, to stop wire feeding, and the press 26 being automatically operated at or about the same time to sever the wire W and separate the completed spring S. The machine may require a separate manual starting to coil another spring, or optionally it can be set to automatically restart and operate cyclically so that an indefinite number of similar springs may be automatically coiled in succession. The last said manner of operation will now be described.

As shown in Fig. 20, the main or coiler motor 78 and the press motor 184 are respectively connectible with main electrical leads 342 by conductors 344 and 346. Also connected with two of said main leads 342 is a transformer 348 providing current for main control conductors 350 and 352.

Connected in a line 354 between the conductors 350 and 352 are manually operable start and stop switches 356 and 358 for the press motor 184. Connected in a line 360 between the conductors 350 and 352 are manually operable start and stop switches 362 and 364 for the coiling motor 78. The start switch 356 when closed closes a holding switch 356a for the line 354 and closes a starting switch 356b for the press motor 184 and also closes an interlock switch 356c in the line 360 for the coiling motor 78. The start switch 362 when closed closes a holding switch 362a for the line 360 and closes a starting switch 362b for the coiling motor 78. The interlock switch 356c prevents the starting of the coiling motor before the starting of the press motor.

The clutch 112 and the brake 114 are connected respectively in lines 366 and 368 which are between conductors 370 and 372, the last said conductors receiving direct current from a rectifier 374 connected in a line 376 between the conductors 350 and 352. Said line 376 includes the switch 337 which is closed for clutch operation. The actual operation of the machine is initiated by engaging the clutch 76 by means of the shipper 77. The movement of the shipper to engage the clutch closes a switch 378a in a line 380 and opens a switch 378b in a line 382. A time relay TR1 is connected in a line 384 between the conductors 350 and 352 and said relay has a shunt connection by means of a line 386. As the next step in starting the coiling operation, a cycle start switch 388 is manually closed momentarily and then permitted to open. Said switch 388 when closed serves to connect said line 380 with said line 386 through a normally closed switch R2$^b$. Closing of the switch 388 energizes the relay TR1 which closes the switch TR1$^a$ to establish a holding circuit independent of said switch 388. The relay TR1 after a suitable interval, closes a switch TR1$^b$ in the line 366 and simultaneously opens a switch TR1$^c$ in the line 368. Closing of the switch TR1$^b$ energizes the clutch 112 and opening the switch TR1$^c$ de-energizes the brake 114. Thus power is transmitted to start the feed rolls and effect feeding of the wire.

Feeding is continued until stopped by the action of the measuring apparatus 27 as hereinafter described. The wire is bent by the coiling abutment 24 and it is guided upwardly by the guides 158 and 160 to form a spring S, all as previously described.

The light source or lamp of the detector 332 constituting a portion of the measuring apparatus receives current through conductors 390 and through a transformer 392 which is connected between the conductors 350 and 352. The photoelectric cell of the detector is connected with the counter 336 by conductors 394. As previously described, the counter 336 transmits an electrical signal after a predetermined number of input impulses corresponding to the feeding of a predetermined length of wire W. This signal is transmitted to energize a relay R1 in an output line 396. The counter can be reset to its zero or starting position by closing a normally open switch in a circuit 398.

A relay R2 is connected in a line 400 extending between the conductors 350 and 352 and through the closed switch 338$^b$ and through an initially open switch R1$^a$ controlled by the relay R1. A time relay TR2 is connected in a line 402 also between the conductors 350 and 352. There is also provided a line 404 through the relay TR2 and parallel with the relay R2. The energization of the relay R1 by a signal from the counter 336 closes the switch R1$^a$ and thus energizes the relay R2 in said line 400 and simultaneously energizes said time relay TR2 in said line 404.

The energization of the relay R2 immediately closes a switch R2$^a$ and opens the normally closed switch R2$^b$ in the circuit of the time relay TR1. The de-energization of the last said relay causes the switches TR1$^b$ and TR1$^c$ to be respectively opened and closed to de-energize the clutch 112 and to energize the brake 114. Thus the feeding of the wire is stopped as the result of a signal from the counter 336.

As stated, feeding is normally stopped by the opening of the normally closed switch R2$^b$. For an emergency, feeding may be stopped by manually opening a normally closed switch 405 in series with said switch R2$^b$.

The energization of the time relay TR2 serves after a predetermined time to close a switch TR2$^a$ and to close a switch TR2$^b$ for starting the press 26. The switch TR2$^a$ is in series with the switch R2$^a$ and the two switches serve to establish a holding circuit for the relay R2 and for the time relay TR2. The closing of the switch TR2$^b$ establishes two parallel circuits 406 and 408 which respectively include solenoids 410 and 412. The solenoid 410 when energized actuates the clutch 202 for the press 26 and the solenoid 412 when energized releases the brake 204 for said press 26. By reason of the delay provided by the relay TR2, the disengagement of the clutch 112 and the engagement of the brake 114 are followed by a definite time interval before the press 26 is operated. This insures that the movement of the wire W will have stopped before said wire is engaged by the tools of the press.

After one revolution of the press shaft 180 the member 210 engages the switch 208 to open it and at the same time closes a switch 414 mechanically connected with the switch 208. The switches 208 and 414 are opened and closed only momentarily and they are automatically returned to their closed and open positions. The opening of the switch 208 breaks the circuit through the relays R2 and TR2. The de-energization of the relay R2 opens the switch R2$^a$ and breaks the holding circuit for said relays R2 and TR2. The de-energization of the relay R2 also closes the switch R2$^b$, but the relay TR1 is not immediately energized for the reason that the switch 388 is open. The de-energization of the relay TR2 opens the switch TR2$^b$ which causes the solenoids 410 and 412 to disengage the clutch 202 and engage the brake 204 to stop the press 26.

The closing of the switch 414 energizes a relay R3 which closes a switch R3$^a$ in the reset circuit 398 for the counter 336. Thus the counter is automatically reset in its zero or starting position. The energization of the relay R3 also closes a switch R3$^b$ which energizes the relay TR1. The last said relay after a definite interval of time serves to restart the cycle of operations. The delay in the action of the relay TR3 gives time for the completed spring S to be removed from the platform 168.

During the set up or for later checking, the press 26 may be "jogged" or operated slowly by means of a manually operable switch 416. The switch 416 is in parallel with the swtich TR2$^b$ and is in series with the switch 378$^b$ which is closed only when the clutch shipper 77 is in position to disengage the main clutch 76. The switch 416 controls the solenoids 410 and 412 as previously described in connection with the switch TR2$^b$.

*Single operation utilizing clutch*

When only a single spring is to be made for each manual starting, the switches 340$^a$, 340$^b$, and 340$^c$ are moved so that they are respectively closed and open.

The manner of operation is similar to that previously described. However, with the switch 340$^b$ open (shown closed) the closing of the switch TR2$^b$ does not start the press. Furthermore, with the switch 340$^c$ open (shown closed) the closing of the switch R3$^b$ does not restart the cycle of operations. The machine goes partly through its cycle of operations as described, but it will stop after feeding and coiling the predetermined length of wire, but without operating the press 26.

The switch 340$^a$ is closed (shown open) and is in series with the closed switch 208. Said switches 340 and 208 are also in series with a manually operable switch 418 and with a relay R4. To operate the press the switch 418 is closed and the relay R4 is energized to close a holding switch R4$^a$ for said relay and to close a switch R4$^b$ which is in parallel with the switch TR2$^b$. The swtich R4$^b$ therefore starts the press 26 as before described and the press is automatically stopped after one stroke thereof by the opening of the switch 208. The switch 414 functions as before described to effect a resetting of the counter 336 but it does not restart the feeding of the wire inasmuch as the switch 350$^c$ is open.

The last-described method of operation is ordinarily used for set-up purposes, single springs being made in preparation for continuous repetitive operation as previously described.

*Repetitive operation utilizing gear segment*

For continuous repetitive operation utilizing the gear segment 116, the switch 337 is opened and the interconnected switches 338$^a$, 338$^b$ and 338$^c$ are moved so that they are respectively closed and open and closed. The interconnected switches 340$^a$, 340$^b$ and 340$^c$ are moved so that they are respectively closed and open and open.

The gear 62 as shown in Fig. 5 is replaced by the gear 130 as shown in Fig. 6. The roller 126 is adjusted on the gear 88 so as to oscillate the segment 116, the extent of oscillation being such that the feed rolls are rotated to such an extent that the required length of wire is fed during each segment oscillation. This method of operation is adapted only for the making of springs requiring only relatively short lengths of wire.

As a step in the set-up procedure, the counter 336 is manually set to give a signal after the feeding of exactly the length of wire W that the machine is set to feed by means of the segment.

The manner of operation with the use of the segment is in many respects similar to that described for the continuous operation utilizing the clutch. After the completion of a spring the feeding of the wire is automatically started upon the next forward movement of the gear segment. The clutch 112 and the brake 114 and the controls therefor are not used. Said clutch and brake are mechanically disconnected by the removal of the gear 62, and they are electrically disconnected by the open switch 337 (shown closed). The press 26 is operated by the action of the relay TR2 as previously described, but said relay is not energized by the switch R1a but by a limit switch 420 which is normally open but which is closed by the cam 140 on the cam shaft 134 as shown in Fig. 8. As before stated, the cam shaft 134 and said cam 140 thereon make one rotation during each feeding cycle. It will be observed that the switch 420 is in parallel with the switch R1a and has the same function with respect to the relays R2 and TR2. The cam 140 is so timed that the press 26 is operated during the return or idle stroke of the gear segment during which there is no wire feeding. The press is stopped by the opening of the switch 208 as previously described.

When the segment is being used for wire feeding, the cam shaft 134 and the cams thereon make one rotation during each feeding cycle. By means of the mechanism shown in Fig. 13, the coiling or bending abutment 24 may be moved toward or from the anvil 25 during wire feeding so as to vary the sharpness of the bending of the wire during the wire feeding period. Similarly, by means of the mechanism shown in Fig. 15, the back bending tool may be moved toward or from the path of the wire so as to vary the extent of back bending during the wire feeding period.

Upon the feeding of the required length of wire the signal from the counter energizes the relay R1 as before described and said relay closes not only the before-mentioned switch R1a but also a switch R1b. The switch R1b is connected in series with the normally closed switch 208 and the closed switch 338a (shown open), and the said switch R1b when closed energizes a relay R5. The relay R5 when energized closes a holding switch R5a and opens a normally closed switch R5b. The last said switch is in series with the closed switch 208 and the closed switch 338a (shown open) and the closed switch 338c (shown open), and in series with the open limit switch 420 and with a signal or alarm device such as a bell 422.

When the required length of wire has been fed, the switch R5b has been opened before the limit switch 420 is closed and no circuit has been completed to ring the bell 422. However, if because of slippage at the feed rolls or for any other reason, the required length of wire has not been fed, the switch R5b remains closed and the bell 422 is rung as soon as the switch 420 is closed. The ringing of the bell serves to indicate the deficiency in feeding.

The invention claimed is:

1. In a cyclically operable spring coiling machine, the combination of rotatable feed rolls for longitudinally feeding wire, a main power shaft, drive mechanism connected with said main power shaft for rotating said feed rolls in the feeding direction, a coiling anvil adjacent the path of wire movement, a coiling abutment in the path of wire movement and serving during wire feeding for bending the fed wire around said anvil to impart a coiling stress thereto which results in the formation of a coil spring, a device for cutting said wire to sever most of the bent portion of said wire from the main body thereof and to separate said coil spring, means separate from and additional to said main power shaft and adapted for actuating said cutting device, measuring apparatus including a device adjacent the feed rolls and separate therefrom and positioned to engage the wire prior to the engagement thereof with said abutment for movement proportionately to the extent of feeding thereof by said feed rolls, means controlled by said measuring apparatus for causing the drive mechanism to stop rotation of said feed rolls and thereby stop feeding after the feeding of a predetermined length of wire as determined by said measuring apparatus, and means also controlled by said measuring apparatus and operable when feeding is stopped for causing said separate actuating means to actuate said wire cutting device, and means controlled by said cutting device and acting after the completion of cutting for causing the drive mechanism to start rotation of the feed rolls and thereby resume wire feeding.

2. In a cyclically operable spring coiling machine, the combination of rotatable feed rolls for longitudinally feeding wire, a main power shaft, drive mechanism connected with said main power shaft and including a member which is oscillated once during each cycle, means including a unidirectional clutch for rotating said feed rolls in the feeding direction during movement of said member in one direction, said clutch causing said rolls to be idle during movement of said member in the opposite direction, a cam shaft connected to have one rotation during each cycle, a coiling anvil adjacent the path of wire movement, a coiling abutment in the path of wire movement and serving during wire feeding for bending the fed wire around said anvil to impart a coiling stress thereto which results in the formation of a coil spring, a device for cutting said wire to sever most of the bent portion of said wire from the main body thereof and to separate said coil spring, means separate from and additional to said power shaft and adapted for actuating said cutting device, and means controlled by said cam shaft and operable during each cycle and when the feed rolls are idle for causing said actuating means to actuate said wire cutting device.

3. In a spring coiling machine, the combination of rotatable feed rolls for longitudinally feeding flat wire, a main power driven shaft, drive mechanism connected with said main shaft for intermittently rotating said feed rolls in the feeding direction, means for stopping feeding after a predetermined length of wire has been fed, a coiling anvil adjacent the path of wire movement, a coiling abutment in the path of wire movement and serving during wire feeding for bending the fed wire around said anvil to impart a coiling stress thereto, means for guiding said wire in a substantially straight path extending from said bending abutment at an angle to the path of wire movement to said anvil, said guiding means serving to prevent immediate coiling of said wire as the result of the stress therein and said guiding means at the leading end thereof permitting the wire to form a spiral coil spring as the result of the coiling stress in said wire, and a device for cutting said wire at a position along said substantially straight path which device includes a tool carrying member movable rectilinearly in a direction perpendicular to said substantially straight wire path and substantially spaced from the ends thereof, said cutting device serving to sever most of the stressed portion of said wire from the main body thereof and to separate said coil spring from the wire.

4. In a spring coiling machine, the combination of rotatable feed rolls for longitudinally feeding wire, a main power driven shaft, means for rotating said power shaft, drive mechanism connected with said main shaft for intermittently rotating said feed rolls in the feeding direction, means for stopping feeding after a predetermined length of wire has been fed, a coiling anvil adjacent the path of wire movement, a coiling abutment in the path of wire movement and serving during wire feeding for bending the fed wire around said anvil to impart a coiling stress thereto, means for guiding said wire in a substantially straight path extending from said bending abutment at an angle to the path of wire movement to said anvil, said guiding means serving to prevent immediate coiling of said wire as the result of the stress therein and said guiding means at the leading end thereof permitting the wire to form a spiral coil spring as the result of the coiling stress in said wire, a device having an initial idle position and adapted for cutting said wire at a position along said substantially straight path which device includes a tool carrying member movable rectilinearly in a direction perpendicular to said substantially straight wire path and substantially spaced from the ends thereof, said cutting device serving to sever most of the stressed portion of said wire from the main body thereof and to separate said coil spring from the wire in said substantially straight path, an electric motor separate from and additional to the means for rotating said main power shaft, means automatically operable upon the completion of the spring for connecting said motor with said cutting device to move it out of its said initial position so as to effect cutting as aforesaid, said motor being free from actuating connection with any other portion of the machine, and means for stopping the movement of the cutting device by said motor after said device has completed its cutting action and has returned to its initial position.

5. In a spring coiling machine, the combination of rotatable feed rolls for longitudinally feeding flat wire, a main power driven shaft, drive mechanism connected with said main shaft for intermittently rotating said feed rolls in the feeding direction, means for stopping feeding after a predetermined length of wire has been fed, a coiling anvil adjacent the path of wire movement, a coiling abutment in the path of wire movement and serving during wire feeding for bending the fed wire around said anvil to impart a coiling stress thereto, means for guiding said wire in a substantially straight path extending from said bending abutment at an angle to the path of wire movement to said anvil, said guiding means serving to prevent immediate coiling of said wire as the result of the stress therein and said guiding means at the leading end thereof permitting the wire to form a spiral coil spring as the result of the coiling stress in said wire, a carrier for a back bending tool movable at an angle to the said substantially straight wire path and adapted for holding a tool in engagement with the wire in said path, means operable during wire feeding and in synchronized relationship thereto for moving said tool carrier relatively to said substantially straight wire path for reversely bending the wire to reduce said stress in portions of said wire, a device for cutting said wire at a position along said substantially straight path to sever most of the stressed portion of said wire from the main body thereof and to separate said coil spring from the wire in said substantially straight path which device includes a tool carrying member movable rectilinearly in a direction perpendicular to said substantially straight wire path.

6. In a cyclically operable spring coiling machine, the combination of rotatable feed rolls for longitudinally feeding wire, drive mechanism for intermittently rotating said feed rolls in the feeding direction, a coiling anvil adjacent the path of wire movement, a coiling abutment adjacent said anvil and in the path of wire movement and serving during wire feeding for bending the fed wire around said anvil to stress said wire for forming a coil spring, measuring apparatus including a device adjacent the feed rolls and separate therefrom and positioned to engage the wire prior to the engagement thereof with said abutment for movement proportionately to the extent of feeding of said wire by said feed rolls, means controlled by said measuring apparatus for causing the drive mechanism to stop the rotation of said feed rolls and thereby stop feeding after the feeding of a predetermined length of wire as determined by said measuring apparatus, a device for cutting said wire to sever most of the bent portion of said wire from the main body thereof, means controlled by said measuring apparatus for starting the action of cutting device when feeding has been stopped, and means automatically operable after each stopping of wire feeding and after each corresponding operation of said cutting device for causing said drive mechanism to start rotation of said feed rolls and thereby resume wire feeding.

7. A spring coiling machine as set forth in claim 6, wherein means is provided for causing a predetermined delay between the action of the drive mechanism to stop feeding and the action of said wire cutting device.

8. A cyclically operable spring coiling machine as set forth in claim 6, wherein the means operable after each stopping of wire feeding and after each operating of the cutting device is positioned and arranged to be automatically operated by said cutting device after each cutting of the wire.

9. In a spring coiling machine, the combination of rotatable feed rolls for longitudinally feeding wire, drive mechanism for intermittently rotating said feed rolls in the feeding direction, a coiling anvil adjacent the path of wire movement, a coiling abutment adjacent said anvil and in the path of wire movement and serving during wire feeding for bending the fed wire around said anvil to stress said wire for forming a coil spring, a device adjacent the feed rolls and separate therefrom and including a member adapted for engaging the fed wire for movement therewith and also including means operable by said member for transmitting a series of electrical impulses proportionate in number to the extent of movement of said member and therefore proportionate in number to the extent of wire feeding, a counter electrically connected with said impulse transmitting means and adapted to transmit an electrical signal after a predetermined number of impulses are transmitted thereto, and means controlled by said signal from said counter for causing the drive mechanism to stop the rotation of said feed rolls and thereby stop feeding.

10. In a spring coiling machine, the combination of rotatable feed rolls for longitudinally feeding wire, drive mechanism for intermittently rotating said feed rolls in the feeding direction, a coiling anvil adjacent the path of wire movement, a coiling abutment adjacent said anvil and in the path of wire movement and serving during wire feeding for bending the fed wire around said anvil to stress said wire for forming a coil spring, a device adjacent the feed rolls and separate therefrom and including a member adapted for engaging the fed wire for movement therewith and also including means operable by said member for transmitting a series of electrical impulses proportionate in number to the extent of movement of said member and therefore proportionate in number to the extent of wire feeding, a counter electrically connected with the last said device and adapted to transmit an electrical signal after a predetermined number of impulses are transmitted thereto, means controlled by said signal from said counter for causing the drive mechanism to stop the rotation of said feed rolls and thereby stop feeding, and a device also controlled by said signal from said counter and operable when feeding is stopped for cutting said wire to sever most of the bent portion of said wire from the main body thereof and to separate the spring.

11. In a spring coiling machine, the combination of rotatable feed rolls for longitudinally feeding wire, drive mechanism for intermittently rotating said feed rolls in the feeding direction, a coiling anvil adjacent the path of wire movement, a coiling abutment adjacent said anvil and in the path of wire movement and serving during wire feeding for bending the fed wire around said anvil to stress said wire for forming a coil spring, a device adjacent the feed rolls and separate therefrom and including a member adapted for engaging the fed wire for movement therewith and also including means operable by said member for transmitting a series of electrical impulses proportionate in number to the extent of movement of said member and therefore proportionate in number to the extent of wire feeding, a counter electrically connected with the last said device and adapted to transmit an electrical signal after a predetermined number of impulses are transmitted thereto, means controlled by said signal from said counter for causing the drive mechanism to stop the rotation of said feed rolls and thereby stop feeding, a device also controlled by said signal from said counter and operable when feeding is stopped for cutting said wire to sever most of the bent portion of said wire from the main body thereof, and electrical means for causing a short time delay between the action of the drive mechanism to stop the feeding and the action of the wire cutting device.

12. In a cyclically operable spring coiling machine, the combination of rotatable feed rolls for longitudinally feeding wire, drive mechanism, a coiling anvil adjacent the path of wire movement, a coiling abutment adjacent said anvil and in the path of wire movement and serving during wire feeding for bending the fed wire around said anvil to stress said wire for forming a coil spring, a device adjacent the feed rolls and separate therefrom and including a member adapted for engaging the fed wire for movement therewith and also including means operable by said member for transmitting a series of electrical impulses proportionate in number to the extent of movement of said member and therefore proportionate in number to the extent of wire feeding, a counter electrically connected with the last said device and having a starting position to which it may be reset, said counter being adapted to transmit an electrical signal after a predetermined number of impulses are transmitted thereto, means controlled by said signal from said counter for causing the drive mechanism to stop the rotation of said feed rolls and thereby stop feeding, means controlled by said signal from the counter for resetting said counter at said starting position, and a device also controlled by said signal from said counter and operable when feeding is stopped for cutting said wire to sever most of the bent portion of said wire from the main body thereof.

13. In a spring coiling machine, the combination of rotatable feed rolls for longitudinally feeding wire, drive mechanism for intermittently rotating said feed rolls in the feeding direction, a coiling anvil adjacent the path of wire movement, a coiling abutment adjacent said anvil and in the path of wire movement and serving during wire feeding for bending the fed wire around said anvil to stress said wire for forming a coil spring, a device adjacent the feed rolls and separate therefrom and including a member adapted for engaging the fed wire for movement therewith and also including means operable by said member for transmitting a series of electrical impulses porportionate in number to the extent of movement of said member and therefore proportionate in number to the extent of wire feeding, a counter electrically connected with the last said device and having a starting position to which it may be reset, said counter being adapted to transmit an electrical signal after a predetermined number of impulses are transmitted thereto, means controlled by said signal from said counter for causing the drive mechanism to stop the rotation of said feed rolls and thereby stop feeding, means controlled by said signal from the counter for resetting said counter at said starting position, a device also controlled by said signal from said counter and operable when feeding is stopped for cutting said wire to sever most of the bent portion of said wire from the main body thereof, and electrical means for causing a short time delay between the action of the wire cutting device and the action of the drive mechanism to start rotation of said feed rolls.

14. In a spring coiling machine, the combination of rotatable feed rolls for longitudinally feeding flat wire, drive mechanism for rotating said feed rolls in the feeding direction, a coiling anvil adjacent the path of wire movement, a coiling abutment in the path of wire movement and serving during wire feeding for bending the fed wire around said anvil to impart a coiling stress thereto, means for guiding said wire in a substantially straight path extending from said bending abutment at an angle to the line of wire movement to said anvil, said guiding means serving to prevent immediate coiling of said wire as the result of the stress therein and said guiding means at the leading end thereof permitting the wire to form a spiral coil spring as the result of the coiling stress in said wire, a device adjacent the feed rolls and separate therefrom and including a member adapted for engaging the fed wire for movement therewith and also including means operable by said member for transmitting a series of electrical impulses proportionate in number to the extent of movement of said member and therefore proportionate in number to the extent of wire feeding, a counter electrically connected with the last said device and adapted to transmit an electrical signal after a predetermined number of impulses are transmitted thereto, and means controlled by said signal from said counter for causing the drive mechanism to stop rotation of said feed rolls and thereby stop feeding, and a device also controlled by said signal from said counter and operable when feeding is stopped for cutting said wire at a position along said substantially straight path so as to sever most of the stressed portion of said wire from the main body thereof and so as to separate said coil spring from the wire in said substantially straight path.

15. In a cyclically operable spring coiling machine, the combination of rotatable feed rolls for longitudinally feeding wire, a main power shaft, a drive mechanism for rotating said feed rolls intermittently in the feeding direction which second drive mechanism includes an oscillating gear segment and a unidirectional clutch, a coiling anvil adjacent the path of wire movement, a coiling abutment in the path of wire movement and serving during wire feeding for bending the fed wire around said anvil to impart a coiling stress thereto which results in the formation of a coil spring, a device automatically operable upon the completion of feeding for cutting said wire to sever most of the bent portion of said wire from the main body thereof and to separate said coil spring, measuring apparatus including a device adjacent the feed rolls and separate therefrom the adapted to engage the wire for movement proportionately to the extent of feeding of said wire thereof by said feed rolls, said measuring device being adapted to be set to measure during each cycle a predetermined length of wire equal to that normally fed by the feed rolls as driven by said drive mechanism, and a device controlled by said measuring apparatus for giving an alarm in the event that the length of wire actually fed by the feed rolls as measured by said measuring apparatus is less than said predetermined length.

16. In a spring coiling machine, the combination of rotatable feed rolls for longitudinally feeding wire, a main power shaft, a first drive mechanism for rotating said feed rolls continuously in the feeding direction which first drive mechanism includes an engageable and disengageable clutch, a second alternatively useable cyclically operable drive mechanism for rotating said feed rolls intermittently in the feeding direction which second drive mechanism includes an oscillating gear segment and a unidirectional clutch, selectively useable means for connecting either the first drive mechanism or the second drive mechanism between said main shaft and said feed rolls, a coiling anvil adjacent the path of wire movement, a coiling abutment in the path of wire movement and serving during wire feeding for bending the fed wire around said anvil to impart a coiling stress thereto which results in the formation of a coil spring, automatic means operable when the first drive mechanism is connected and serving for disengaging the clutch of the first drive mechanism to stop rotation of said feed rolls and thereby stop feeding after feeding to a predetermined extent, and a device automatically operable upon the completion of feeding by either mechanism for cutting said wire to sever most of the bent portion of said wire from the main body thereof and to separate said coil spring.

17. In a spring coiling machine, the combination of rotatable feed rolls for longitudinally feeding wire, a main power shaft, a first drive mechanism for rotating said feed rolls continuously in the feeding direction which first drive mechanism includes an engageable and disengageable clutch, a second alternatively useable cyclically operable drive mechanism for rotating said feed rolls intermittently in the feeding direction which second drive mechanism includes an oscillating gear segment and a unidirectional clutch, selectively useable means for connecting either the first drive mechanism or the second drive mechanism between said main shaft and said feed rolls, a coiling anvil adjacent the path of wire movement, a coiling abutment in the path of wire movement and serving during wire feeding for bending the fed wire around anvil to impart a coiling stress thereto which results in the formation of a coil spring, measuring apparatus including a device adjacent the feed rolls and separate therefrom and adapted to engage the wire for movement proportionately to the extent of feeding thereof by said feed rolls, means controlled by said measuring apparatus for disengaging the clutch of said first drive mechanism when the last said mechanism is connected, the last said means serving to stop rotation of said feed rolls and thereby stop feeding after the feeding of a predetermined length of wire as determined by said measuring apparatus, and a device automatically operable upon the completion of feeding by either mechanism for cutting said wire to sever most of the bent portion of said wire from the main body thereof and to separate said coil spring.

18. A spring coiling machine as set forth in claim 17, wherein an alarm device is provided and wherein said measuring apparatus is connectible with said alarm device when the second drive mechanism is connected, said measuring apparatus serving to operate said alarm device in the event that the length of wire actually fed by the feed rolls as measured by said measuring apparatus is less than said predetermined length.

19. In a spring coiling machine, the combination of rotatable feed rolls for longitudinally feeding wire, a main power shaft, a first drive mechanism for rotating said feed rolls continuously in the feeding direction which first drive mechanism includes an engageable and disengageable clutch, a second alternatively useable cyclically operable drive mechanism for rotating said feed rolls intermittently in the feed direction which second drive mechanism includes an oscillating gear segment and a unidirectional clutch, selectively useable means for connecting either the first drive mechanism or the second drive mechanism between said main shaft and said feed rolls, a coiling anvil adjacent the path of wire movement, a coiling abutment in the path of wire movement and serving during wire feeding for bending the fed wire around said anvil to impart a coiling stress thereto which results in the formation of a coil spring, automatic means operable when the first drive mechanism is connected and serving for disengaging the clutch of the first drive mechanism to stop rotation of said feed rolls and thereby stop feeding after feeding to a predetermined extent, for cutting said wire to sever most of the bent portion of said wire from the main body thereof and to separate said coil spring, means separate from and additional to said power shaft and adapted for actuating said cutting device, and two separate alternatively useable means for causing said actuating means to actuate said wire cutting device, one of said separate means being automatically operable upon the completion of feeding by said first drive mechanism and the other of said separate means being automatically operable upon the completion of feeding by said second drive mechanism.

20. In a spring coiling machine, the combination of rotatable feed rolls for longitudinally feeding wire, a main power shaft, a first drive mechanism for rotating said feed rolls continuously in the feeding direction which first drive mechanism includes an engageable and disengageable clutch, a second alternatively useable cyclically operable drive mechanism for rotating said feed rolls intermittently in the feeding direction which second drive mechanism includes an oscillating gear segment and a unidirectional clutch, selectively useable means for connecting either the first drive mechanism or the second drive mechanism between said main shaft and said feed rolls, a coiling anvil adjacent the path of wire movement, a coiling abutment in the path of wire movement and serving during wire feeding for bending the fed wire around said anvil to impart a coiling stress thereto which results in the formation of a coil spring, measuring apparatus useable with said first drive mechanism including a device adjacent the feed rolls and separate therefrom and adapted to engage the wire for movement proportionately to the extent of feeding thereof by said feed rolls, means controlled by said measuring apparatus for disengaging the clutch of the first drive mechanism to stop rotation of said feed rolls and thereby stop feeding after the feeding of a predetermined length of wire as determined by said measuring apparatus, a cam shaft connected to have one revolution during each cycle when the second drive mechanism is being used, a device for cutting said wire to sever most of the bent portion of said wire from the main body thereof and to separate said coil spring, means separate from and additional to said power shaft for actuating said cutting device, means controlled by said measuring apparatus and operable upon disengagement of the clutch of the first drive mechanism and serving to cause said actuating means to actuate said wire cutting device, and means controlled by said cam shaft and operable after each feeding by the second drive mechanism for causing said actuating means to actuate said wire cutting device.

References Cited in the file of this patent

UNITED STATES PATENTS

| 882,385 | Harter | Mar. 17, 1908 |
| 1,670,499 | Ekstedt | May 22, 1928 |
| 1,680,489 | Wadsten | Aug. 14, 1928 |
| 1,842,223 | Walton | Jan. 19, 1932 |
| 2,149,942 | Prentice | Mar. 7, 1939 |
| 2,371,816 | Frank | Mar. 20, 1945 |
| 2,394,824 | Todd | Feb. 12, 1946 |
| 2,457,705 | Moran | Dec. 28, 1948 |
| 2,541,232 | Forster | Feb. 13, 1951 |
| 2,609,191 | Foster | Sept. 2, 1952 |
| 2,609,192 | Lermont | Sept. 2, 1952 |
| 2,650,822 | Wyza | Sept. 1, 1953 |
| 2,735,454 | Forster | Feb. 21, 1956 |
| 2,738,187 | Johnson | Mar. 13, 1956 |
| 2,774,407 | Jansen | Dec. 18, 1956 |
| 2,801,669 | Lermont | Aug. 6, 1957 |

FOREIGN PATENTS

| 590,410 | Germany | Jan. 3, 1934 |